Patent [19] [11] Patent Number: 4,562,533
Hodel et al. [45] Date of Patent: Dec. 31, 1985

[54] DATA COMMUNICATIONS SYSTEM TO SYSTEM ADAPTER

[75] Inventors: Alfred Hodel, Au, Switzerland; Dennis B. Merkes; Venu Chari, both of San Diego, Calif.

[73] Assignee: NCR Corporation, Dayton, Ohio

[21] Appl. No.: 642,736

[22] Filed: Aug. 20, 1984

Related U.S. Application Data

[63] Continuation of Ser. No. 327,283, Dec. 3, 1981, abandoned.

[51] Int. Cl.[4] .............................................. G06F 3/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,940,743 | 2/1976 | Fitzgerald | 364/200 |
| 4,014,005 | 3/1977 | Fox et al. | 364/200 |
| 4,047,162 | 9/1977 | Dorey et al. | 364/200 |
| 4,091,455 | 5/1978 | Woods et al. | 364/200 |
| 4,096,566 | 6/1978 | Borie et al. | 364/200 |
| 4,155,117 | 5/1979 | Mitchell, Jr. et al. | 364/200 |
| 4,170,038 | 10/1979 | Bouvier et al. | 364/200 |
| 4,234,919 | 11/1980 | Bruce et al. | 364/200 |
| 4,253,146 | 2/1981 | Bellamy et al. | 364/200 |
| 4,257,099 | 3/1981 | Appelt | 364/200 |
| 4,276,594 | 6/1981 | Morley | 364/200 |

Primary Examiner—Eddie P. Chan
Attorney, Agent, or Firm—J. T. Cavender; Edward Dugas; Floyd A. Gonzalez

[57] ABSTRACT

This invention relates to an adapter for interprocessor communications and the method therefor. An adapter is included in a data processing system which has a plurality of central systems, each of the plurality of central systems having at least one serial channel control processor. The data processing system further has a dynamic channel exchange for providing switching logic thereby permitting each of the plurality of central systems access to a plurality of peripherals coupled to the dynamic channel exchange. The adapter is operatively connected to the dynamic channel exchange for providing communications between any pair of central systems. The adapter comprises a link control module which provides handshake control to perform message bit/byte synchronization and translation. A message protocol module, which is operatively connected to the link control module, controls the transmission of information with a selected one of the plurality of central systems, the control being administered by interfacing with the serial channel control processor in accordance with a defined message protocol. A data buffer provides intermediate storage of information passed between the pair of central systems. A control processor schedules and monitors the information transfer into and out of the data buffer by interfacing with the message protocol module in accordance with the defined message protocol thereby achieving the information transfer between the pair of central systems.

5 Claims, 31 Drawing Figures

FIG. 5A

| BIT | 1 | 6 | 7 | 8 | 9 | 11 | 12 | 16 | 17 | 29 | 30 | 32 |
|---|---|---|---|---|---|---|---|---|---|---|---|---|
| | OP - CODE | | | | TEST MUX CODE | | ALU CONTROL | | LITERAL OR BRANCH ADDRESS | | BRANCH CONTROL | |

BRANCH OPTION

FIG. 5B

| BIT | 1 | 6 | 7 | 8 | 9 | 12 | 13 | 16 | 17 | 29 | 30 | 32 |
|---|---|---|---|---|---|---|---|---|---|---|---|---|
| | OP - CODE | | | | BUS SOURCE | | BUS DESTINATION | | LITERAL OR BRANCH ADDRESS | | BRANCH CONTROL | |

BRANCH OPTION

FIG. 10

FROM SCCP

| SIDN | SO | >

FROM PA

< | LA | DIR | SER. SETUP INFO |

| DLI | SI | >

< | DA | 0 | INPUT DATA |

| DLI | SI | >

< | DA | 0 | INPUT DATA |

{ | DLI | SI | >

< | BRK | 0 |

OR

{ | 0 | TRM | >

< | BRK | 0 |

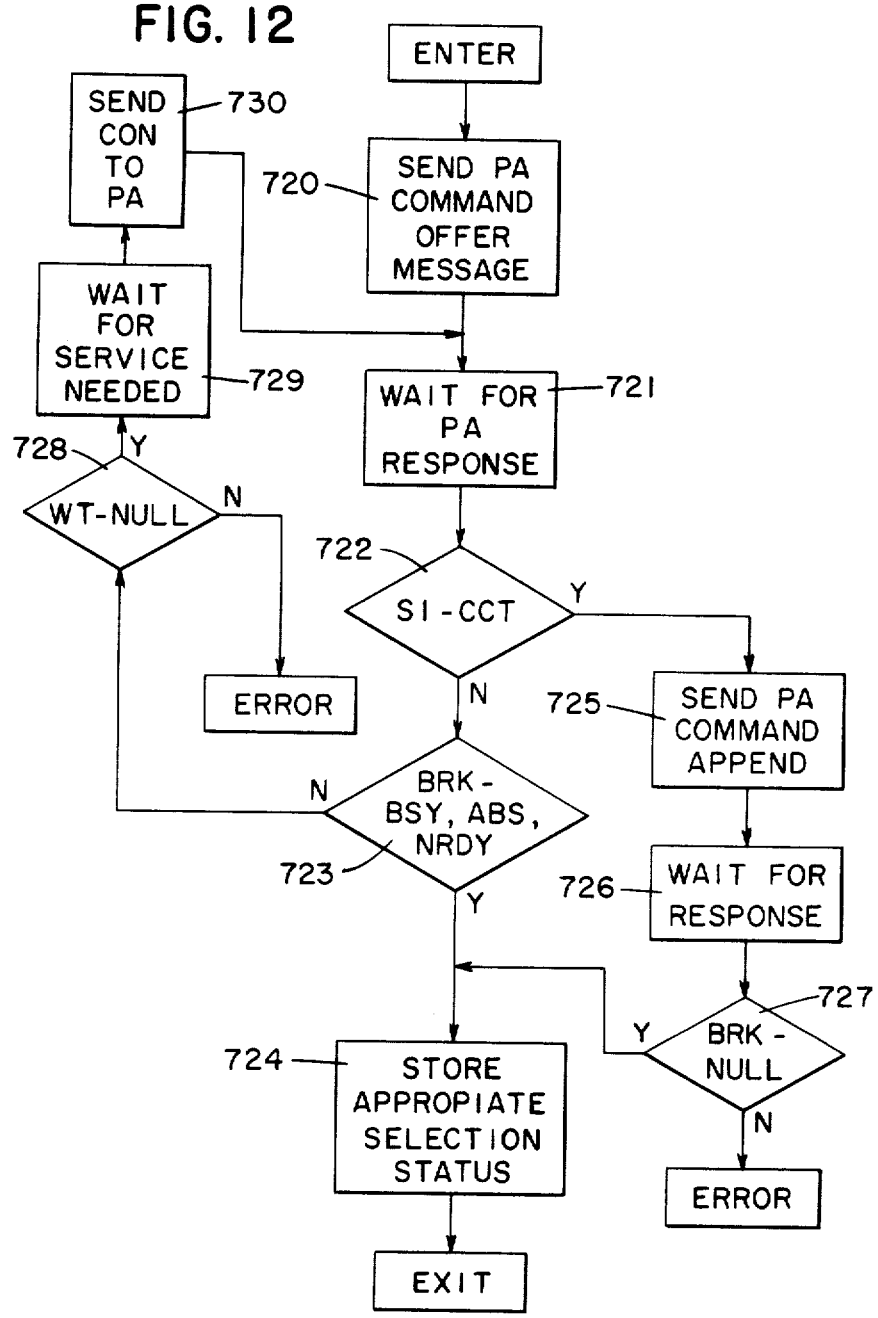

DATA COMMUNICATIONS SYSTEM TO SYSTEM ADAPTER

This is a continuation of co-pending application Ser. No. 327,283 filed on Dec. 3, 1981, now abandoned.

FIELD OF THE INVENTION

This invention relates to intercomputer communications, and more particularly to an adapter for information transfer between computer systems of different data processing systems and the method therefor, wherein the data processing systems employ a channel exchange for sharing peripherals.

MICROFICHE APPENDICES

Appendices I and II have been provided in the form of microfiche, and are incorporated herein by reference.

BACKGROUND OF THE INVENTION

In multiple data processing systems, each having at least one processor, many methods exist for interfacing the processors of the different data processing systems. When two computers are to be connected together, past practice has had each computer treat the other as an external input/output device. Commonly, a data channel of one processor is connected to a data channel of the other processor and then, in order to transfer, each processor must initialize its data channel with address and count information and start the channels reading into memory or writing out of memory, as appropriate. This means that before any block transfers can occur, both processors must cooperate in taking care of the initialization.

Another recognized architecture for interprocessor communication is through the use of a common bus. Once again, before any data transfers can occur, both processors must cooperate which can result in tying up the processor for an unduly long period of time.

By utilizing the adapter of the present invention as an intermediary device between the two processors, which adapter may be treated as a peripheral, the I/O initialization and initiation may be performed by the processors without requiring cooperation between them before the transfer, thereby eliminating tying up the processors. In addition, the same logic, including the software and firmware, utilized to communicate with the various peripherals may be utilized.

Accordingly, it is an object of the present invention to provide an adapter for providing a common link between data processing systems.

This and other objects of the present invention will become more apparent when taken in conjunction with the following description and attached drawings, wherein like characters indicate like parts, and which drawings form a part of the present application.

SUMMARY OF THE INVENTION

The invention set forth and claimed herein relates to a data processing system which has a dynamic channel exchange and a plurality of central systems. Each of the central systems includes at least one processing element, a memory operatively connected to the processing element and an input/output processor (IOP) connected to the memory. The IOP includes at least one serial channel control processor. Each of the IOPs, at least one peripheral subsystem, and an adapter are operatively connected to the dynamic channel exchange. The IOPs and the adapter implement a method of communication between respective central systems associated with the IOPs. The method of communication comprises the steps of enabling the adapter for accepting an input from at least one central system. The next step initiates an output request by one of the plurality of central systems. A first message sequence, executed between the central system which initiated the output request and the adapter, is performed for transmitting information from the initiating central system to the adapter. A second message sequence is then performed, between the adapter and the central system designated for receiving by the initiating central system, for transmitting information from the adapter to the receiving central system.

Further, the invention set forth and claimed herein includes an adapter in a data processing system which has a dynamic channel exchange and a plurality of central systems. Each of the plurality of central systems has at least one serial channel control processor. The dynamic channel exchange provides switching logic thereby permitting each of the plurality of central systems access to a plurality of peripherals coupled to the dynamic channel exchange. The data processing system further includes an adapter which is operatively connected to the dynamic channel exchange for providing communications between any pair of central systems. The adapter comprises a link control module, which has a bit serial link terminal adapted to receive and transmit messages with the dynamic channel exchange, to provide handshake control to perform message bit/byte synchronization and translation. A mesage protocol module, which is operatively connected to the link control module, controls the transmission of information with a selected one of the plurality of central systems, the control being administered by interfacing with the serial channel control processor in accordance with a defined message protocol. A data buffer, which is operatively connected to the link control module and to the message protocol module, provides intermediate storage of information passed between the pair of central systems. A control processor, which is operatively connected to the message protocol module and the data buffer, schedules and monitors the information transfer into and out of the data buffer by interfacing with the message protocol module in accordance with the defined message protocol, thereby achieving the information transfer between the pair of central systems.

BRIEF DESCRIPTION OF THE DRAWINGS

FIGS. 5A and 5B show the control store microinstruction word format;

FIG. 10 shows the command messages in a typical data input sequence;

FIG. 12 is a detailed flow diagram of the command offer sequence performed by the SCCP;

DETAILED DESCRIPTION

Figure 1:
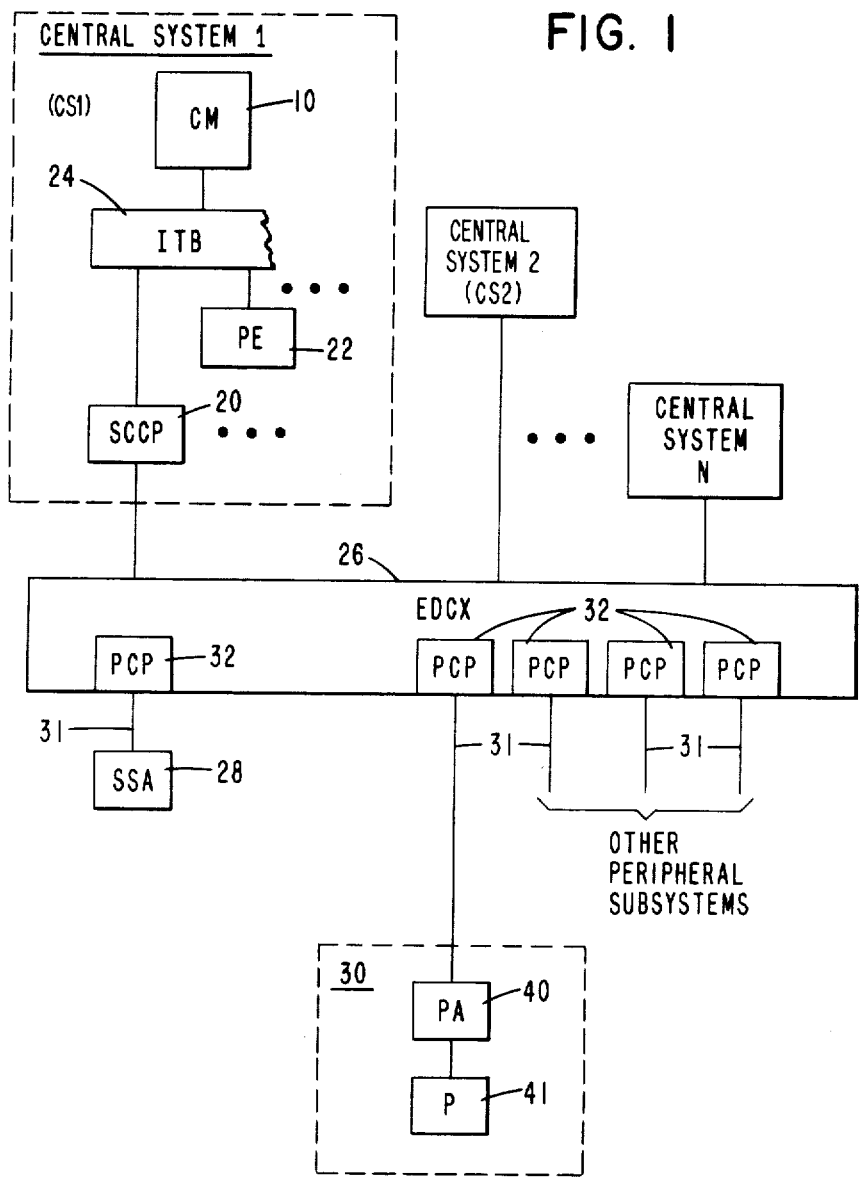
FIG. 1 is a block diagram of a multiple data processing or control system connected through a dynamic channel exchange.

The invention set forth and claimed herein includes the system to system adapter (SSA) which is utilized for achieving communication between processors of different central systems, and the method therefor. Referring to FIG. 1, there is shown a plurality of central systems, each central system having an Input/Output Subsystem (IOSS) architecture. Each central system comprises a memory 10, also referred to herein as the central memory (CM) 10, at least one processing element (PE) 22, and a serial channel control processor (SCCP) 20 which in part forms an I/O processor. The coupling of the elements of the central system is shown in FIG. 1 utilizing an internal transfer bus (ITB) 24 although it will be understood by those skilled in the art that any standard coupling means may be used. The SCCP 20 of each of the central systems are coupled to an eternal dynamic channel exchange 26 (EDCX), or more simply referred to as a dynamic channel exchange 26 (DCX). The peripheral adapters (PA) 40 of the various peripheral subsystems 30 are coupled to the DCX 26. In addition, the SSA 28 is also coupled to the DCX 26. The peripheral devices are operatively coupled to peripheral controller ports 32 (PCP) of the DCX 26 via bit serial links 31.

Still referring to FIG. 1, the serial channel control processor 20 forms part of the I/O processor of the central system. The SCCP 20 is the overall I/O controller of the central system and interfaces with the peripheral adapter 40 for peripheral device information transfer, the SCCP 20 performing the various control, transmission initiation, and termination functions in accordance with a defined protocol to be described hereinunder. The SCCP 20 functions are implemented in the SCCP 20 utilizing a ROM and associated control logic, which is more fully described herein.

The peripheral subsystem 30 includes a peripheral adapter 40 and a peripheral device 41. The peripheral adapter 40 of the IOSS performs some of the controller functions for the peripheral device 41, the peripheral adapter 40 exchanging control messages and data with the SCCP 20 in accordance with the defined mesage protocol. The message exchanges of the peripheral adapter 40 are implemented by the use of a ROM based device which is more fully described herein.

Data transmission is via the bit serial link/PCP between the SCCP 20 and the peripheral adapter 40 at a fixed transmission speed. The transmission speed utilized in the preferred embodiment is sixteen megabits per second (two megabytes per second). Transmission between the SCCP 20 and the peripheral adapter 40, is independent of the transfer rate of the peripheral 41 or of the central memory 10. The SCCP 20 and the peripheral adapter 40 of peripheral subsystem 30 both contain buffers to facilitate this isolation. Communications over the bit serial links are message oriented, so as to comply with the defined message protocol and a defined transmission protocol. In the preferred embodiment, up to 256, 8-bit bytes of data can be transferred in one direction as a block. The SCCP 20 is peripheral independent and therefore can serve any peripheral subsystem 30. I/O system bandwidth can be increased by adding additional SCCPs 20.

Figure 2:
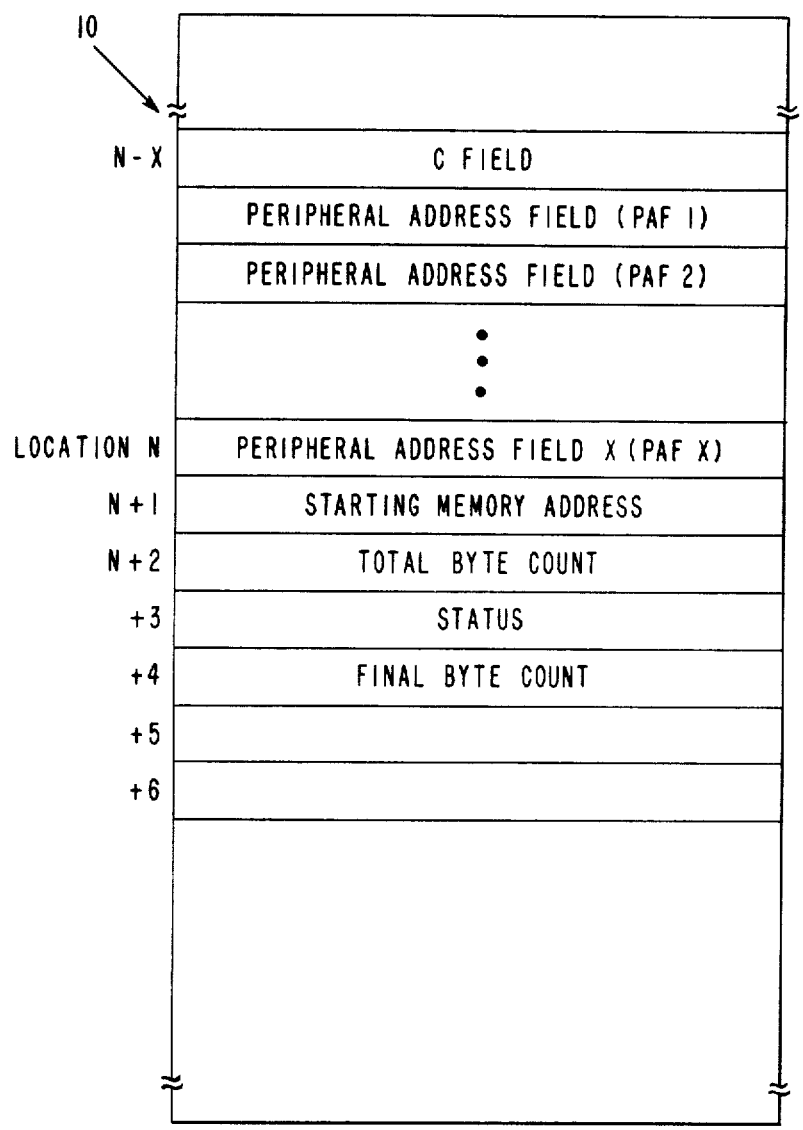
FIG. 2 depicts the format of the central memory I/O task structure.
Figure 3:
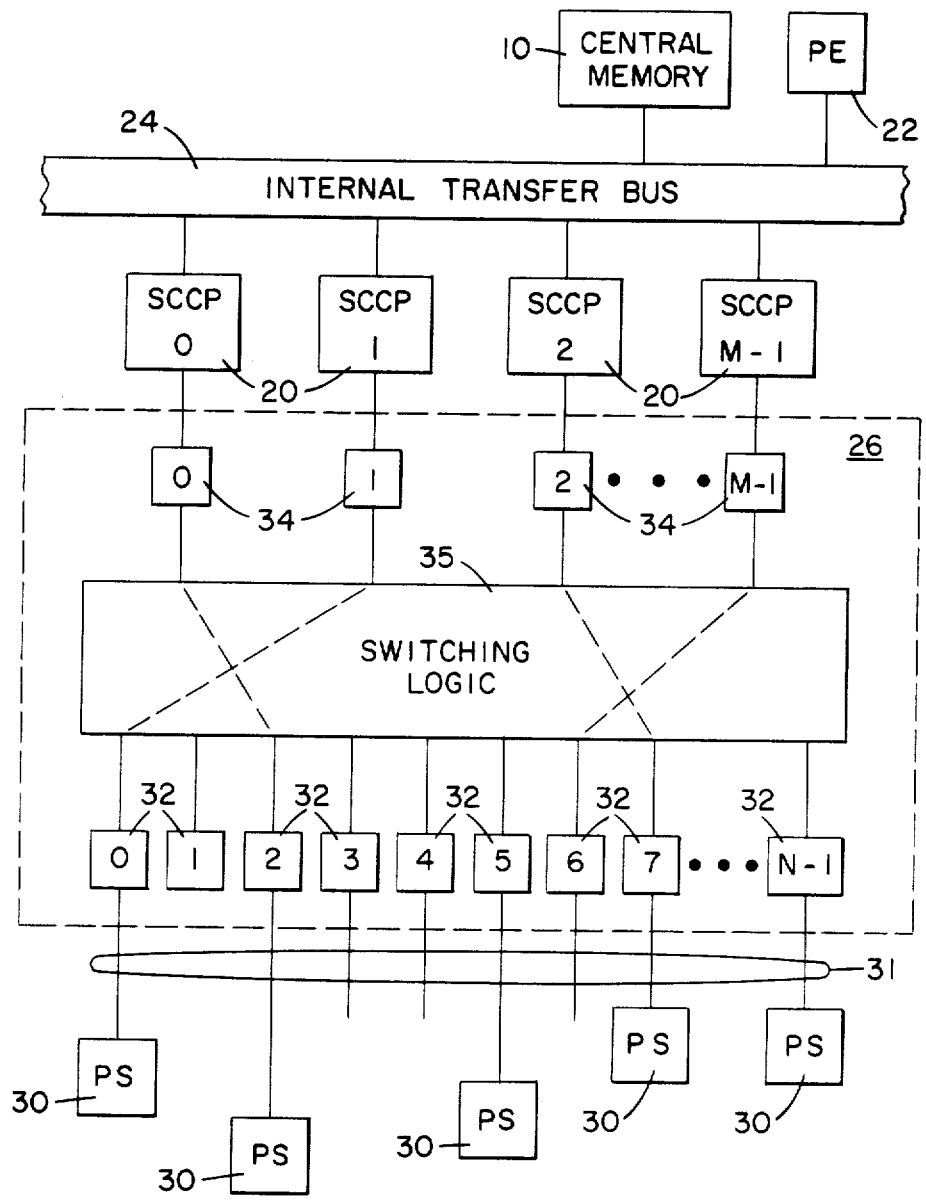
FIG. 3 is a block diagram showing the switchable data paths through a dynamic channel exchange.

Before describing the operation of the SSA 28, it will be advantageous to first give a description of the IOSS operation in the central system with a peripheral subsystem 30. Referring to FIG. 2, there is established within central memory 10 an I/O task structure (IOTS). The IOTS is a memory resident table, denoted herein as I/O field (IOF), that permits communication between the I/O software of the processing elements 22 and the serial channel control processor 20. The IOF contains the control information utilized by SCCP 20. The Peripheral Address Fields (PAF) indicate the specific peripheral to be addressed, and the function to be performed. The number of PAF bytes of the preferred embodiment can be as many as nine depending on the peripheral subsystem 30. The Starting Memory Address specifies the central memory 10 starting location of the data to be transmitted or received, the Total Byte Count indicates the number of words to be transmitted or received, and the Final Byte Count indicates the number of bytes transmitted at the end of a transfer sequence. The C field is utilized to check that the SCCP is communicating with the correct peripheral. The Status word is utilized to indicate the current state of the communication. Referring to FIG. 3, the DCX 26 is shown interfacing with SCCPs 20 through standard interface SCCP ports 34, and interfacing the peripheral subsystems 30 through bit serial channels 32 via bit serial lines 31. There are m-SCCP ports 34 and n-bit serial channels (BSC) 32, with the number m being less than the number n. In the preferred embodiment, m is four and n is eight, expandable up to 8 and 32 respectively. The SCCP ports 34 and the bit serial channels 32 each connect to the switching logic 35. The switching logic 35 thereby allows an SCCP 20 to communicate with any peripheral adapter 40 by providing a data path between the SCCP 20 and the desired peripheral adapter 40.

As mentioned above, the peripheral subsystem 30 includes a peripheral adapter 40 and a peripheral device 41. The peripheral adapter 40 of the IOSS performs the controller function for the peripheral device 41 exchanging the control messages and data with the SCCP 20 in accordance with the defined message protocol. The message exchanges of the peripheral adapter 40 are implemented by the use of a ROM which is more fully described herein.

The serial channel control processor 20 is a small device-independent processor used to control the input and output of data between the processing element 22 and the peripheral subsystem 30. Still referring to FIG. 3, the SCCP 20 communicates with the I/O software of the processing element 22 via the I/O task structure of central memory 10 and the internal transfer bus 24. Each SCCP 20 occupies one bus position on the internal transfer bus 24 and is connected to an associated SCCP port 34 of the DCX 26. An SCCP 20 can request communication to any bit serial channel 32 through switching logic 35 of DCX 26, but the requesting SCCP 20 may connect to and control only one BSC 32 at a time. Thus, the services between all the BSCs 32 are time shared, thereby permitting an SCCP 20 to control the I/O transfer between a processing element 22 and a peripheral subsystem 30. The control functions of the SCCP 20 will be described in detail hereinunder.

Data transmission is via bit serial channel 32 at a fixed transmission speed, the transmission speed utilized in the preferred embodiment being sixteen megabits per second (two megabytes per second). Transmission between the SCCP 20 and the peripheral adapter 40, via the DCX 26, is independent of the transfer rate of the peripheral subsystem 30 or of the central memory 10. The SCCP 20 and the peripheral adapter 40 of peripheral subsystem 30 both contain buffers to facilitate this isolation. Communications over the BSC lines 31 is message oriented, so as to comply with a defined message protocol and a defined transmission protocol. In the preferred embodiment, up to 256, 8-bit bytes of data can be transferred in one direction as a block. BSC 32 connections are ordinarily maintained between SCCP 20/DCX 26 as long as information transfer is occurring. By polling the BSC 32 when no I/O transmissions are taking place, the SCCP 20/DCX 26 is available to serve a waiting peripheral subsystem 30. In this way maximum bit serial channel 32 utilization is achieved and where multiple SCCPs 20 are available, load sharing is accomplished. The SCCP 20/DCX 26 is peripheral independent and therefore can serve any peripheral subsystem 30. I/O system bandwidth can be increased by adding additional SCCPs 20.

Figure 4:
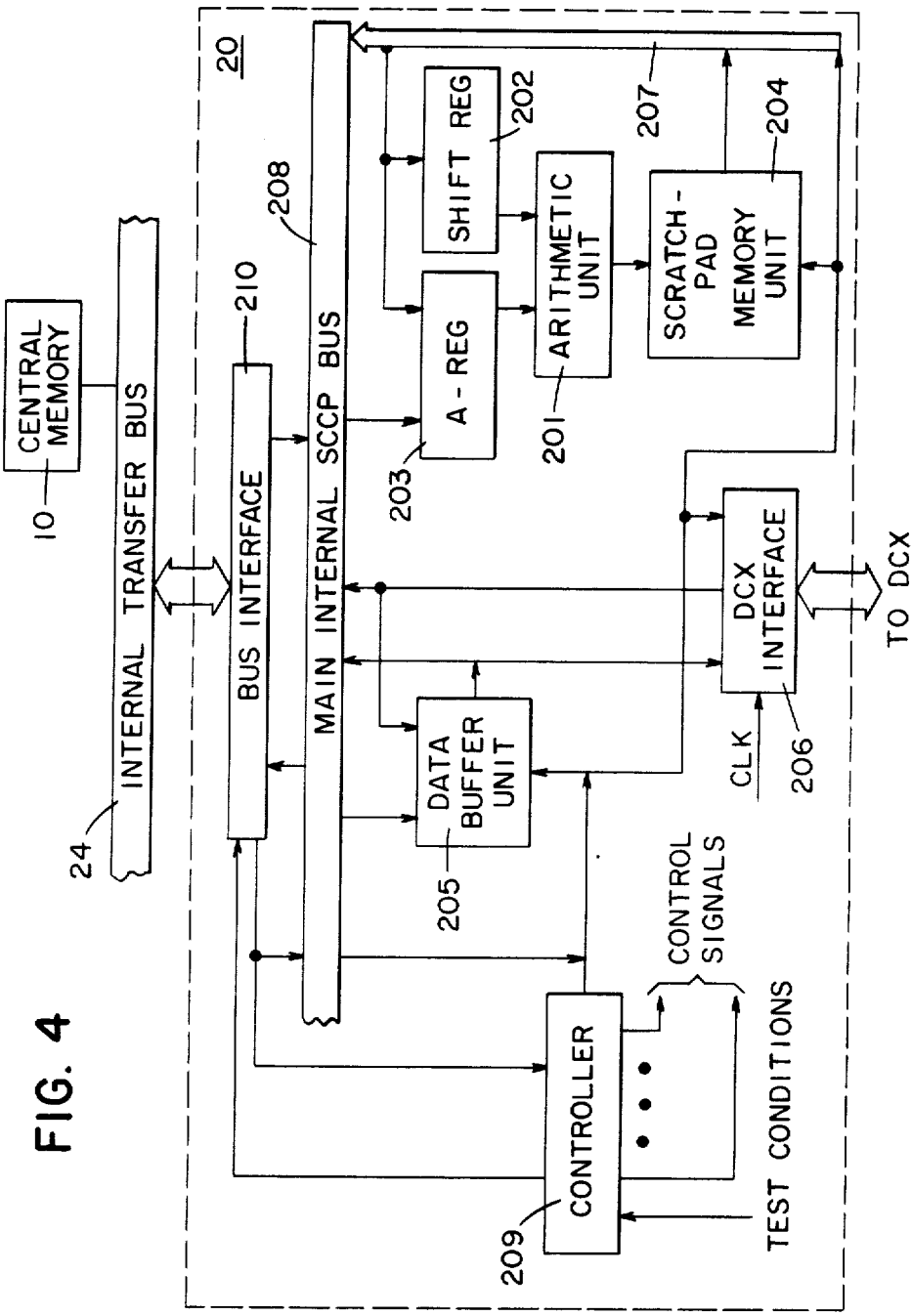
FIG. 4 is a block diagram of a serial channel control processor.

FIG. 4 shows a block diagram of an SCCP 20. The arithmetic unit 201 comprises an arithmetic and logic unit (ALU) and associated logic for performing standard arithmetic and logic functions. The arithmetic unit 201 operates on two eight-bit operands obtained from shift register 202, which provides the "B" operand and A-register 203 which contains the "A" operand. The A-register may be loaded via an internal bus 207 or via a main internal SCCP bus 208. The result of the ALU operation can be saved in a scratch pad memory unit 204. Various results of the ALU operations can be tested, such as a zero result, and inputted to a controller 209 as a TEST CONDITION signal. The specific arithmetic and logic operations performed by arithmetic unit 201, of the preferred embodiment, are delineated in Appendix I. The implementation of arithmetic unit 201 is not shown in detail because it is well-known to those skilled in the art.

The scratch pad memory unit 204 is comprised of a scratch pad memory and an address counter. The scratch pad memory is loaded from arithmetic unit 201 and the address counter is loaded from controller 209. The contents of the scratch pad memory can be outputted to the internal bus 207 to be loaded into the A-register 203, the shift register 202, or onto the main internal SCCP bus 208 for ultimate loading into other registers of SCCP 20. In the preferred embodiment the scratch pad memory is a 1024×8 bit RAM. The data buffer unit 205 is coupled to the main internal SCCP bus 208 for storing information from central memory 10 via internal transfer bus 24 and bus interface 210, and is coupled to DSX interface 206 for storing information from the peripheral subsystem. Data buffer unit 205 is also coupled to main internal SCCP bus 208 and DCX interface 206 for outputting stored information to central memory 10 or to the peripheral subsystem 30. The data buffer unit 205 comprises a RAM, and an A-address counter and a B-address counter. A-address counter and B-address counter are loaded from the controller 209 for accessing the RAM. In the preferred embodiment, the RAM of data buffer unit 205 comprises 1024 10-bit bytes. Eight bits of each byte comprise data, bit 9 is odd parity over the 9 bits and bit 10 is used to indicate the last data byte in the data block.

The bus interface 210 comprises the hardware needed to interface the SCCP 20 to the ITB 24. The bus interface 210 couples to main internal SCCP bus 208 and to controller 209. In the preferred embodiment, the bus interface 210 is the local bus adapter described in U.S. Pat. No. 4,038,644, entitled "Destination Selection Apparatus for a Bus Oriented Computer System", assigned to the same assignee as the present application.

The controller 209 contains the control circuitry for the SCCP 20. The controller 209 is coupled to the central memory 10 via the bus interface 210 for communicating with the I/O software of the processing element 22. The controller 209 contains a control store, a microinstruction register, an address control unit, and the decode logic which generates the control signals to control I/O (i.e., bus interface 210 and DCX interface 206), arithmetic unit 201, registers 202, 203, scratch pad memory 204, data buffer unit 205, and buses 207, 208 according to the actions specified in the microinstruction. A program storage RAM is the control store for the SCCP 20 containing the micro-instruction sequences for implementing the defined message protocol which will be described in detail hereinunder. The program storage RAM of the preferred embodiment is a 4096×36 bit RAM.

The DCX interface 206 comprises the logic to properly transmit the control and data messages between the SCCP 20 and the DCX 26 and performs a byte-to-bit transformation (transmission to the peripheral subsystem 30) or a bit-to-byte transformation (transmission from the peripheral subsystem 30). Internal to the SCCP 20, the DCX interface 206 couples to the data buffer unit 205 and the main internal SCCP bus 208 for transmitting information from the peripheral subsytem 30, and further couples to the data buffer unit 205 for receiving information from central memory 10. The DCX interface also couples to the controller 209 for receiving control signals and control information. A CLK signal is also supplied to the DCX interface 206 and to the peripheral subsystem 30.

Referring to FIGS. 5A and 5B, the control store microinstruction word format of the controller 209 is shown. The microinstruction word fields are composed of an Op-Code, Bus Source, Bus Destination, Test MUX Code, ALU Control, Literal or Branch Address and Branch Control. Bits 7 and 8 of the opcode, depending on the specific opcode, are used in conjunction with the branch control field. The opcode is an 8-bit field that defines the operation to be performed. The operation is decoded, and the control signals generated to control the arithmetic unit 201, A-register 203, shift register 202, scratch pad memory unit 204, data buffer unit 205, DCX interface 206, and bus interface 210. The bus source specifies the source which drives the main internal SCCP bus 208. The bus destination specifies the destination of the data on the main internal SCCP bus 208. The specified destination will only be loaded if the command specified by the opcode being executed requires it. The specific HEX code and the corresponding function for the various fields of the preferred embodiment are delineated in Appendix I of the microfiche, Serial Channel Control Processor/Internal Dynamic Channel Exchange, April 1979, sheets 4-17 through 4-22 inclusive.

Figure 6A:
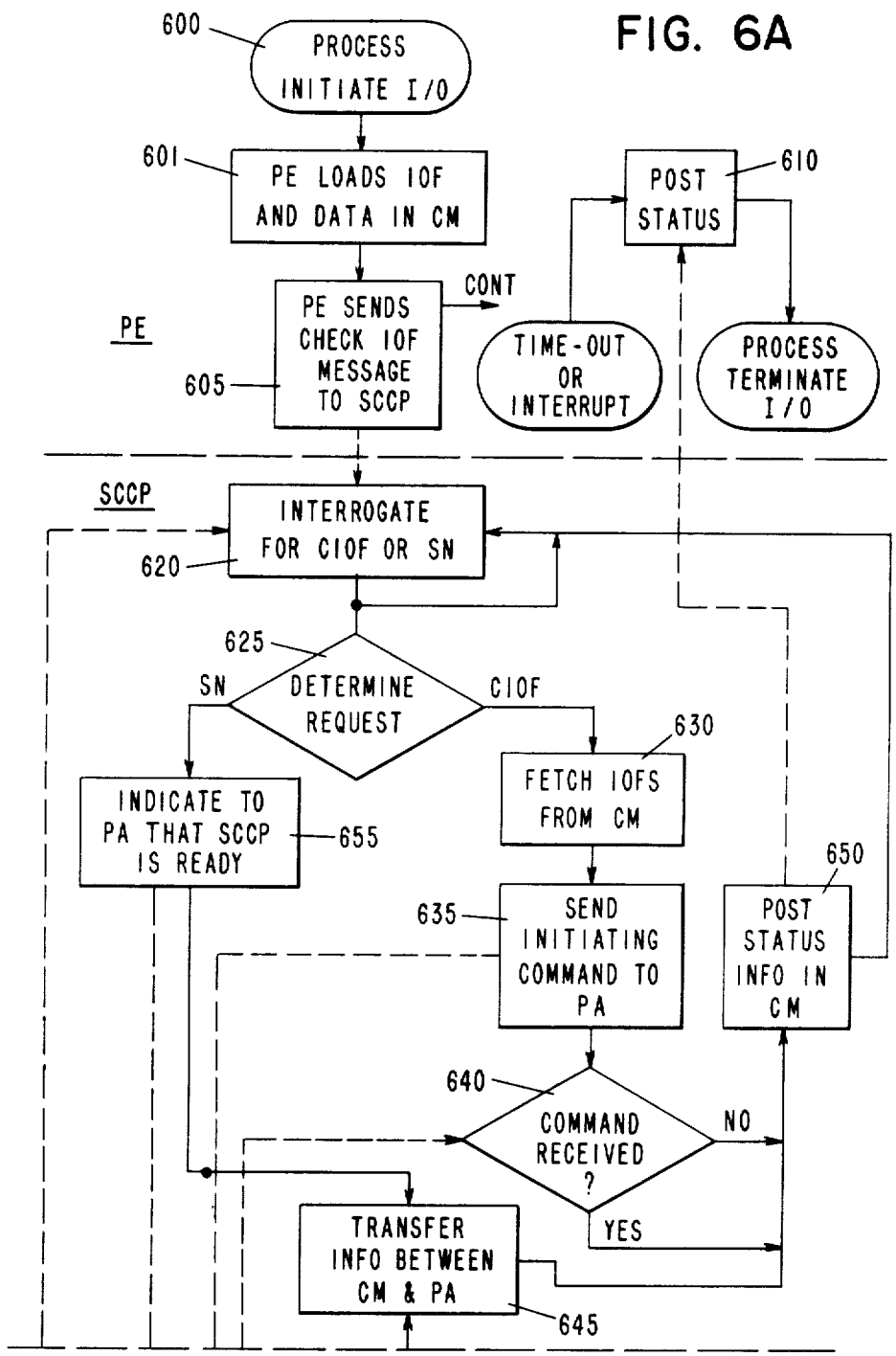
FIGS. 6A and 6B are a flowchart illustrating the operation of the central system with a peripheral subsystem.
Figure 6B:
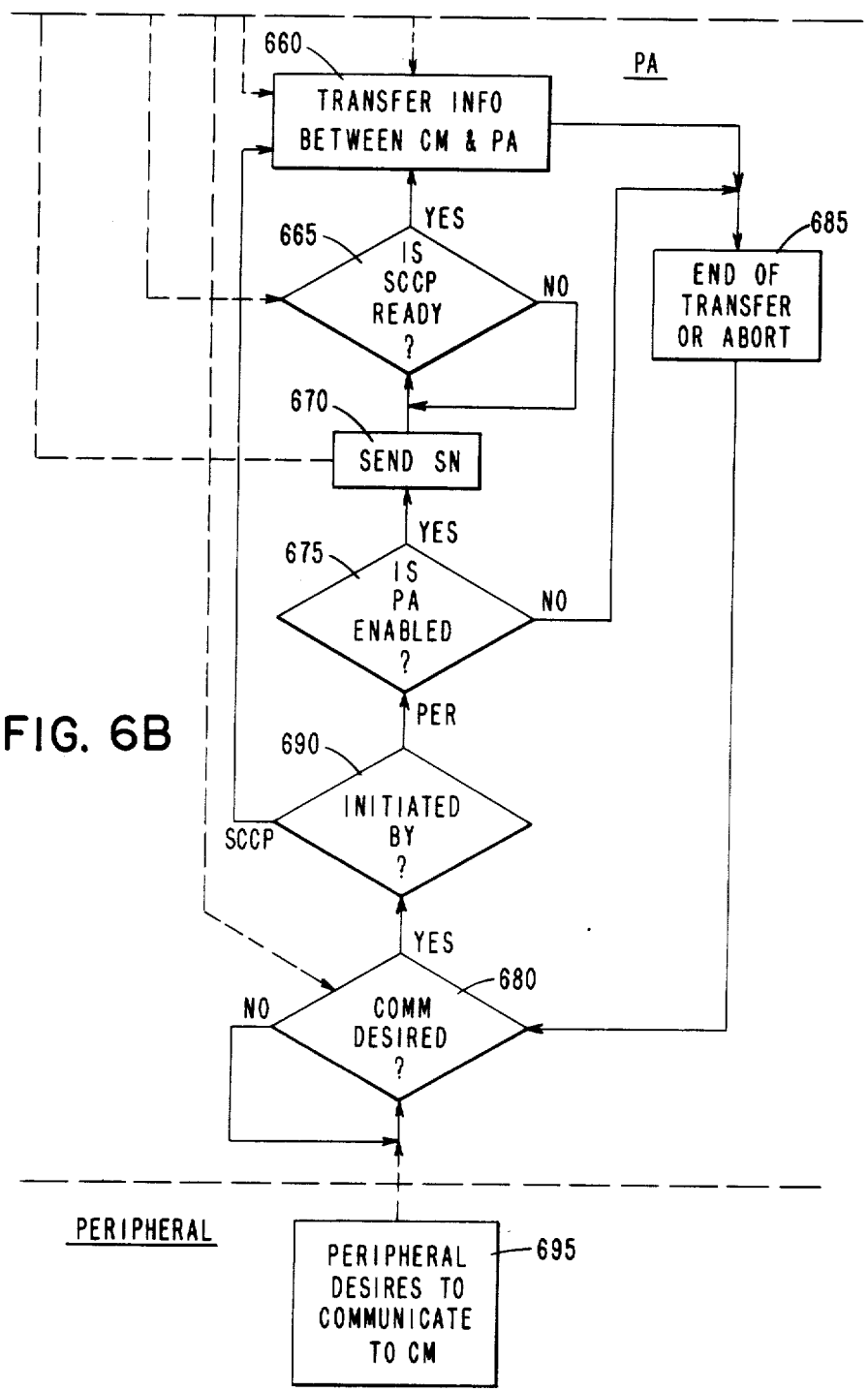
Figure 6C:
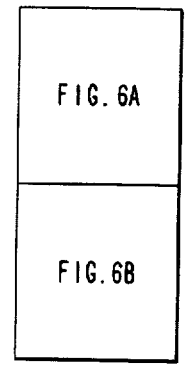
FIG. 6C shows the relationship of FIGS. 6A and 6B.

The systems operation will now be described with the aid of the flowcharts of FIGS. 6A and 6B taken together as shown by FIG. 6C. FIGS. 6A and 6B show a generalized function flow of the operations performed by the individual elements, namely the processing element 22, the SCCP 20, the peripheral adapter 40, and the peripheral device 41, in the overall I/O operation, the dotted lines indicating "control type" information transferred between elements.

When the processor element 22 desires to communicate to a peripheral 41, the Process Initiate I/O routine (Block 600) of the I/O software of the processor element 22 is executed which creates the I/O fields (IOF) and places these fields within the I/O task structure of central memory 10 (block 601), the I/O task structure being an area of central memory 10 allocated for storing the lists and tables utilized in performing the I/O function in accordance with the defined message protocol. After the IOFs and the data to be transferred to the peripheral 41 are stored within the proper locations of central memory 10, a message is sent to SCCP 20 (block 605) which indicates a check of the IOF of central memory 10 is to be performed (dotted line from block 605), the PE 22 continuing to execute its assigned task. The processor element 22 plays no further role in the transfer of information between central memory 10 and peripheral adapter 40. The I/O software of PE 22 reads the status word of the IOF when the data transfer is complete (block 610), the I/O completion indicated to the I/O software via a message from the SCCP 20 or the I/O software times out the I/O if no termination has occurred. If the status signifies that the data transfer is completed, the next data transfer with that peripheral can be set up and initiated. If the status indicates an incomplete or a busy, a retry may be attempted or some other appropriate action may be taken by the I/O software.

When no I/O transmissions are taking place, the SCCP 20 is in an interrogation loop (block 620) testing for a Check IOF (CIOF) message from PE 22 (dotted line from block 605) or a Service Needed (SN) signal from peripheral subsystem 30 (dotted line from block 670). When an input is received, the SCCP determines the specific request (block 625). (Assume for the present that a "Check IOF" message was received from PE 22.) When a Check IOF message is received by the SCCP 20, the IOF is read from central memory 10 (block 630). (The data contained in the IOF is used by SCCP 20 to instruct the DCX 26 to connect the appropriate PCP 32.) The SCCP 20 then passes initiating command (or enabling) information (block 635) to the peripheral adapter 40 (dotted line from block 635) in accordance with the defined message protocol which is described in detail hereinunder. The peripheral adapter 40 responds to the SCCP 20 that the initiating command was received (dotted line from block 660). The SCCP 20 waits a specified amount of time for the response from the peripheral adapter 40 that the initiating (or enabling) command was received (block 640). The initial command transfer performed between CM 10 and PA 40 includes the transfer of command information (i.e., the command appended message exchange to be described in detail hereinunder) required by the PA 40 to properly communicate with any SCCP 20 which might subsequently service the PA 40 to handle the actual data exchange message sequence. When the initial transfer sequence is complete, the SCCP 20 disconnects from the PA 40, status information is stored in central memory 10 (block 650) and the SCCP 20 returns to interrogating loop (block 620). If the peripheral adapter 40 is busy or does not respond, the SCCP 20 stores the busy or inoperative status in the appropriate location of the IOF and the transmission is terminated (block 650). The SCCP 20 then returns to the interrogating loop (block 620). After the initial transfer sequence, the SCCP 20 responds to the Service Needed indication from the peripheral subsystem 40. For output transfers (from the PE 22) initiated by the PE 22, the peripheral adapter 40 sends Service Needed after the peripheral device 41 has completed the command operation (e.g., slewing or skipping) specified in the initial transfer sequence.

When the peripheral device 41 desires to communicate to the central memory 10, the peripheral indicates this by informing the peripheral adapter (dotted line from block 695) which may be by an interrupt, a signal line, etc., the indication being a function of the peripheral 41.

When no I/O transmissions are taking place, the peripheral adapter is essentially in an idle mode, depicted by block 680, as being in a loop awaiting a transmission initiation request. When the transmission initiation request is received, the peripheral adapter 40 determines the request is from the peripheral device (PER) (block 690), and if the peripheral adapter had been previously enabled (block 675), a Service Needed signal is sent (block 670) to the DCX 26. During quiescent periods, the SCCPs 20 poll the PCP 32 of the DCX 26 for Service Needed. The first SCCP 20 to poll that PCP 32 will service the peripheral adapter. In this manner the SCCP 20 receives the Service Needed signal (dotted line from block 670). The SCCP 20 detects the Service Needed and indicates to the PA 40 that the SCCP 20 is ready (block 655) (dotted line from block 655), and proceeds to transfer information in accordance with the defined message protocol (block 645). Meanwhile, upon receipt of an indication that the SCCP 20 is ready (block 665) the PA 40 proceeds to its transfer counterpart (block 660) and begins the transfer of information between central memory 10 and the peripheral adapter 40 (block 660) in accordance with the defined message protocol. When the transfer is completed (block 685), the peripheral adapter 40 enters the idle state (block 680). When the transmission initiation request is from the SCCP 20, the peripheral adapter 40 makes that determination (block 690) and proceeds to transfer information in accordance with the defined message protocol (block 660). The SCCP initiated transmission request includes the enabling command which may not be followed by any subsequent information transfer from the SCCP 20. The peripheral adapter 40 then returns to the idle loop (block 680) in accordance with the defined message protocol.

A message protocol is defined for the orderly transfer of information between the SCCP 20 and the peripheral adapters 40. The SCCP 20 can initiate an information transfer to a peripheral adapter 40 by issuing an appropriate control message. The message protocol, as defined, does not allow a peripheral adapter 40 to initiate an information transfer to the central system (i.e., to the SCCP 20). A peripheral adapter 40 must wait for a command from the SCCP 20 before it can transfer information. The information transfer is on a transmit-response basis. The SCCP 20 issues a message to a peripheral adapter 40 and waits for a response from the peripheral adapter 40 before issuing another message. A peripheral adapter 40 issues a message only in response to a received message. Recovery procedures are defined within the message protocol of the preferred embodiment to allow for the retransmission of any message found to be in error. Error sequences are not described herein. Many alternative approaches to error sequences, which include retry, recovery, etc., are well known and may be implemented by those skilled in the art without departing from the true spirit of the invention.

Figure 7:
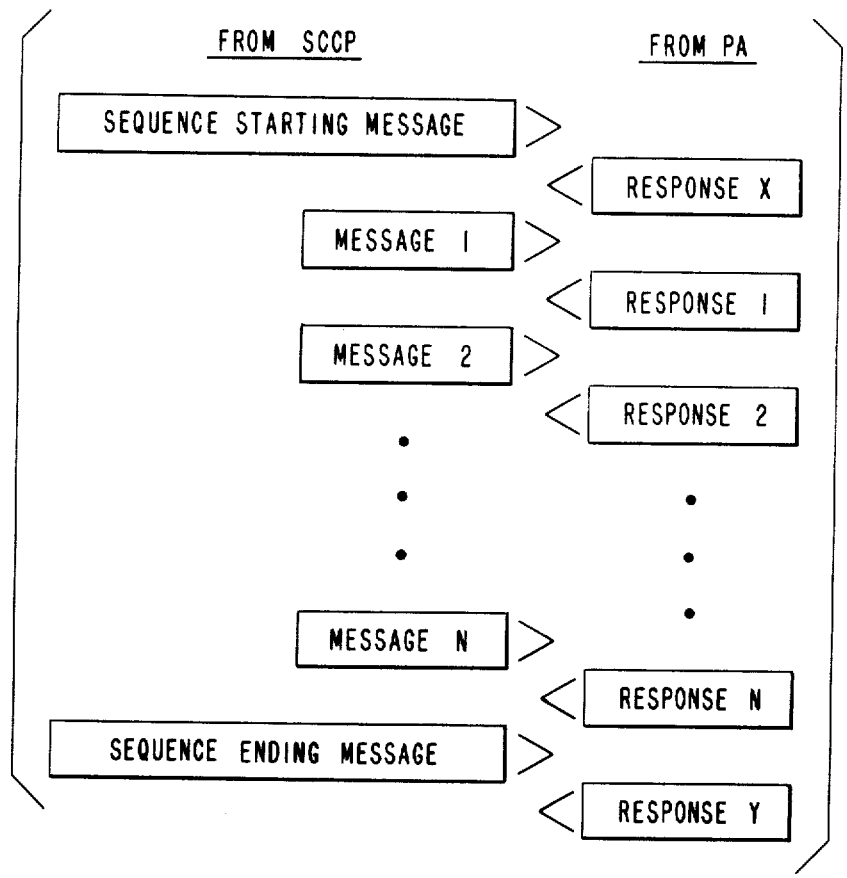
FIG. 7 depicts a typical message sequence.

The defined message protocol is message oriented. The basic unit of information grouping is a message, the message being the vehicle for every command, every response, and all information that is transmitted. Referring to FIG. 7, a typical message sequence is depicted. A message sequence is initiated by the SCCP 20 by transmitting a sequence starting message to which the peripheral adapter 40 answers with response X, the response being a response message. Message 1 from SCCP 20 is followed by a Response 1 from peripheral adapter 40, the sequence of Message-Response continuing until all the data exchange has occurred. The SCCP 20 then terminates the transmission by initiating a Sequence Ending Message to which the peripheral adapter responds with response Y. A message sequence between the SCCP 20 and a peripheral adapter 40 comprises one or more exchanges, an exchange being defined as a message sent by the SCCP 20 and an appropriate response message returned by the peripheral adapter 40.

Figure 8:
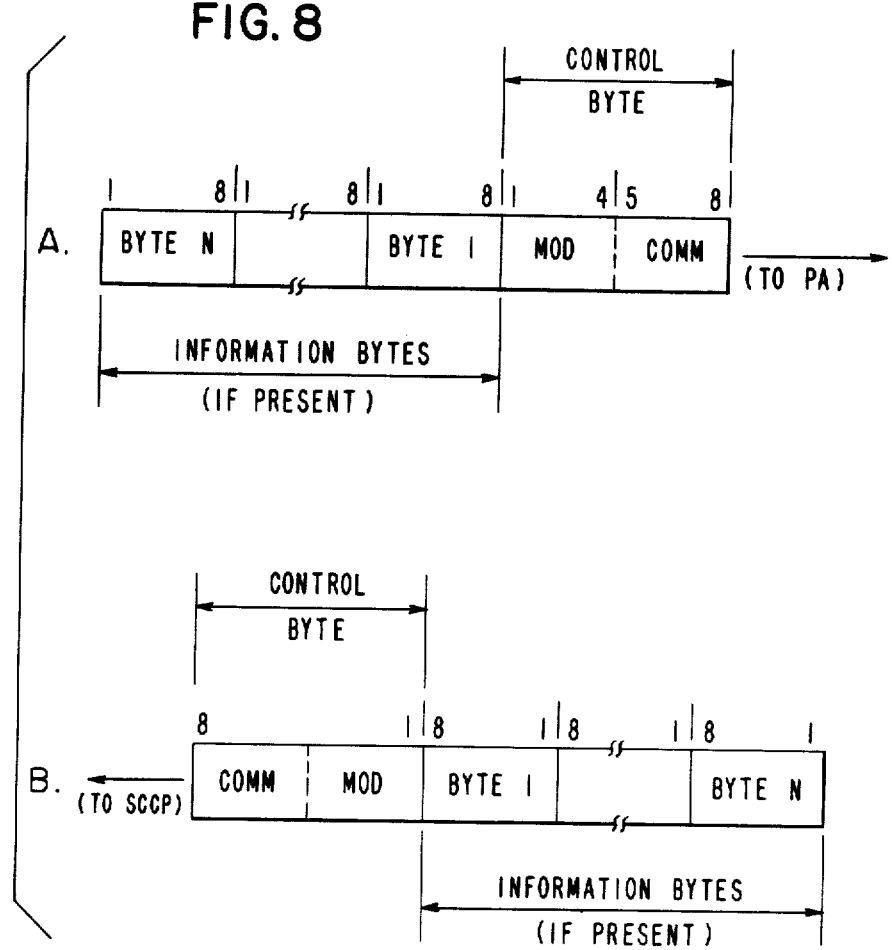
FIG. 8 shows the message formats.

Referring to FIG. 8, the message formats can be seen. FIG. 8 shows the message format from the SCCP 20 to the PA 40, and FIG. 8B shows the message format from the PA 40 to the SCCP 20. Eight-bit bytes are shown with the arrowhead showing the direction of transmission, bit 8 of the control byte being the first bit transmitted. Each message contains a control byte for specifying the command and responses required to control the message transfer, bits 5-8 containing the command and bits 1-4 containing a modifier. A message may or may not contain information bytes, depending on the control byte. The number of information bytes present is variable and not fixed, up to a maximum number of 256 eight-bit bytes in a single message transmission. The defined message protocol calls for the SCCP 20 to issue I/O commands to the peripheral adapters 40, to poll peripheral adapters 40 for I/O data transfer servicing, to abort I/O operations in progress on the peripheral adapters 40 upon command from the processing element 22, and to abort information exchanges between the central system and the peripheral adapters 40 upon command from the processing element 22. In order to implement these I/O control functions, 4 basic sequence initiation commands are defined. They are, command offer (CO), service offer (SO), abort order (AO), and reset (RS). During a message sequence, control byte commands issued by the SCCP 20 include, send information (SI), data appended (DA), command appended (CA), terminate (TRM), continue (CON), message error (MER), and break connection (BC). Control byte commands issued by the peripheral adapter during a message sequence include, send information (SI), literal appended (LA), data appended (DA), status appended (SA), message error (MER), wait (WT), and break (BRK).

Figure 9:
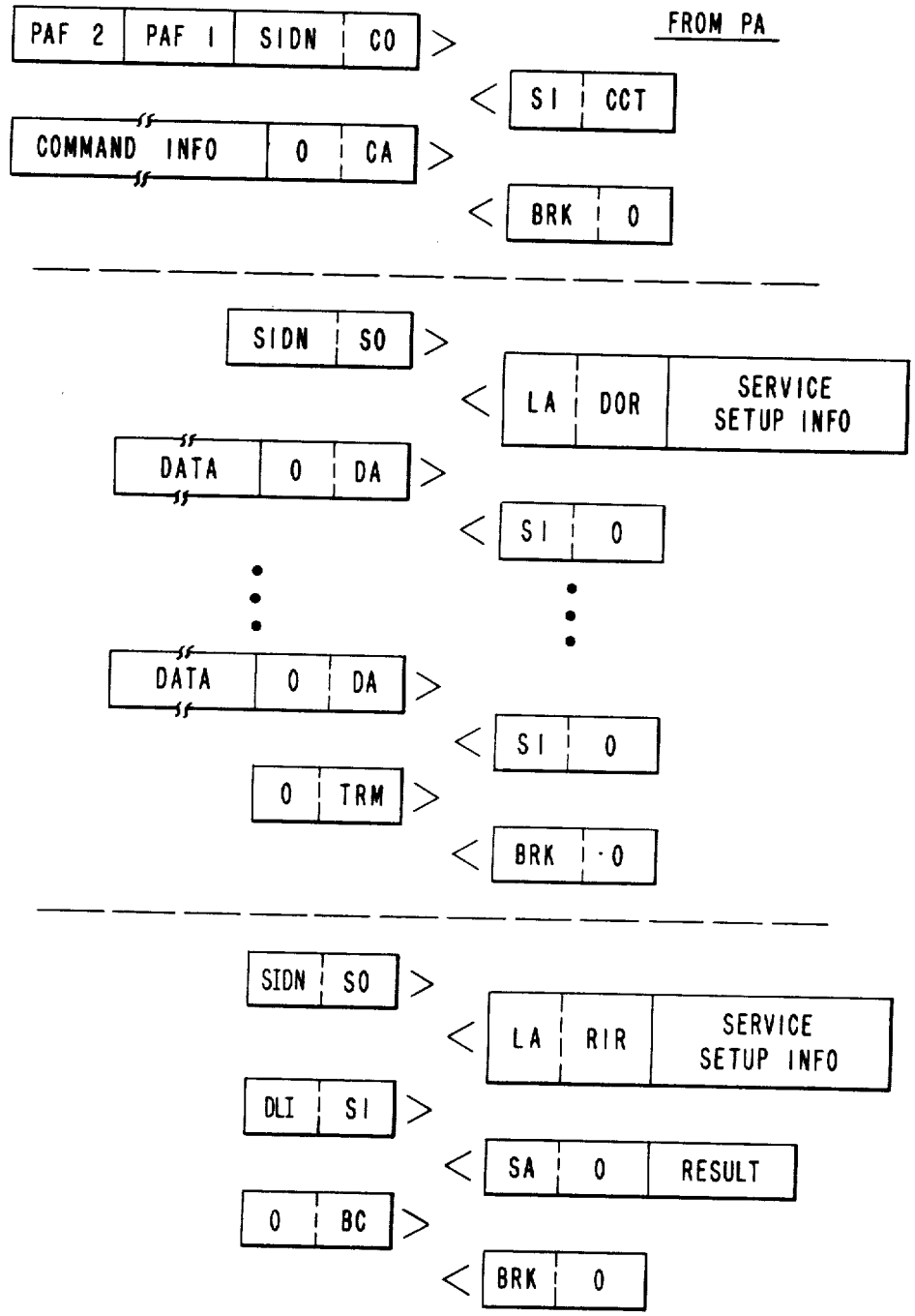
FIG. 9 shows the command messages in a typical data output sequence.

A typical output sequence from the central system to a peripheral subsystem will now be described. Referring to FIG. 9, the complete output sequence is shown.

The discussion begins with the operations of the SCCP 20. (Recall that the PE 22 causes the SCCP 20 to start with the CIOF message after having set up central memory 10.) The SCCP 20 connects to the proper PCP 32 as specified in the PAF (Peripheral Address Field) and sends a command offer message to the PA 40 containing the first 2 PAF bytes, the CO message being defined as a 3 byte message. The modifier SIDN is a source identifier. The PA 40 responds with a send information message, the modifier CCT of the control byte indicating a PAF byte count. This response indicates additional command bytes are required. The SCCP 20 sends the additional control information to the PA 40 via the command appended message, the zero modifier (sometimes denoted NULL) indicating no specific function. (A "zero" or "NULL" modifier is one modifier value among many possible values. Some message types, like BRK, have several modifier values - 0, 1, 2, etc. - each denoting a specific function.) The PA 40 accepts and stores the control information and returns a break message terminating this part of the transmission. The SCCP 20 breaks the PCP 32 connection and continues to scan for Service Needed messages. Any SCCP 20 which next determines while scanning PCP 32 that the PA 40 requires service will start a new message sequence with a Service Offer message, containing the source ID modifier. The PA 40 responds with a literal appended message, indicating it is ready to accept the data by the data output ready modifier (DOR), and containing service setup information required by the SCCP. The service setup information is the memory address of IOF, which in turn contains the current address of CM 10 at which data transfer is to be commenced or resumed, denoted as "L" field, and the peripheral identifier, which permits verification by the SCCP 20 that the proper IOF fields are being utilized for the peripheral device, denoted as check field or "C" field. The transfer of the L field and C field in the literal appended message by the peripheral adapter allows any SCCP 20 to service the PA 40. The data appended-send information message exchanges continue until all the data has been outputted, each data appended message containing a part, or block, of the total information to be transferred. The SCCP 20 then ends the sequence with a terminate message, the PA 40 responding with a break (BRK), thereby releasing the SCCP 20. When a BRK message is received, the SCCP 20 updates the Starting Memory Address so it will be available if the total data transfer has not been completed.

When the PA 40 again sends Service Needed, an SCCP 20 detecting it initiates a Service Offer sequence. The SO message transferred out is responded to by an LA message with the result input ready (RIR) modifier and any service setup information. The SCCP 20 sends an SI message which is responded to by a status appended (SA) message with the result (or status) indicating the results of the data transfer. The SCCP 20 then sends the break connection message and the PA 40 responds with a break, thereby releasing the SCCP 20, completing the data output transfer.

For a peripheral to input data to the central system, the peripheral must first be "enabled" by the PE 22. The PE 22 must set aside an IOF area in central memory and cause a command offer sequence to take place. The PA 40 stores the necessary control information (e.g., memory address of IOF in which the address for data is to be stored) and can pass this information to the SCCP 20 which will subsequently service the PA 40, thereby allowing any SCCP 20 within a central system to service the PA 40.

When the peripheral desires to communicate with the central memory 10, the peripheral causes the PA 40 to raise the Service Needed signal. The first SCCP 20 of the specified central system to detect the Service Needed signal initiates the service offer sequence as shown in FIG. 10. Referring to FIG. 10, the SCCP 20 sends the service offer message. The PA 40 responds with a literal appended message with a data input ready (DIR) modifier. The message also contains information which the SCCP will need to communicate with central memory 10, such as the IOF address. The SCCP 20 then transfers a send information message, the modifier DLI specifying the maximum number of appended bytes the central system can accept in a message from the PA 40. The PA sends the data appended message with the input data, the SI/DA message exchange continuing until the transfer is terminated. The transfer can typically be terminated in one of two ways. The first way shown in FIG. 10, is by the PA sending a break response to a SI message. In the second way the termination is initiated by the central system sending a terminate message with a break response from the PA 40. The status sequence can then take place as in the data output case described above to complete the transfer.

The operation of the SCCP 20 is achieved by the execution of the microinstructions stored in the control store of the controller 209. The execution of the microinstructions, which serve to configure the control store, implement the defined message protocol as described above.

Figure 11:
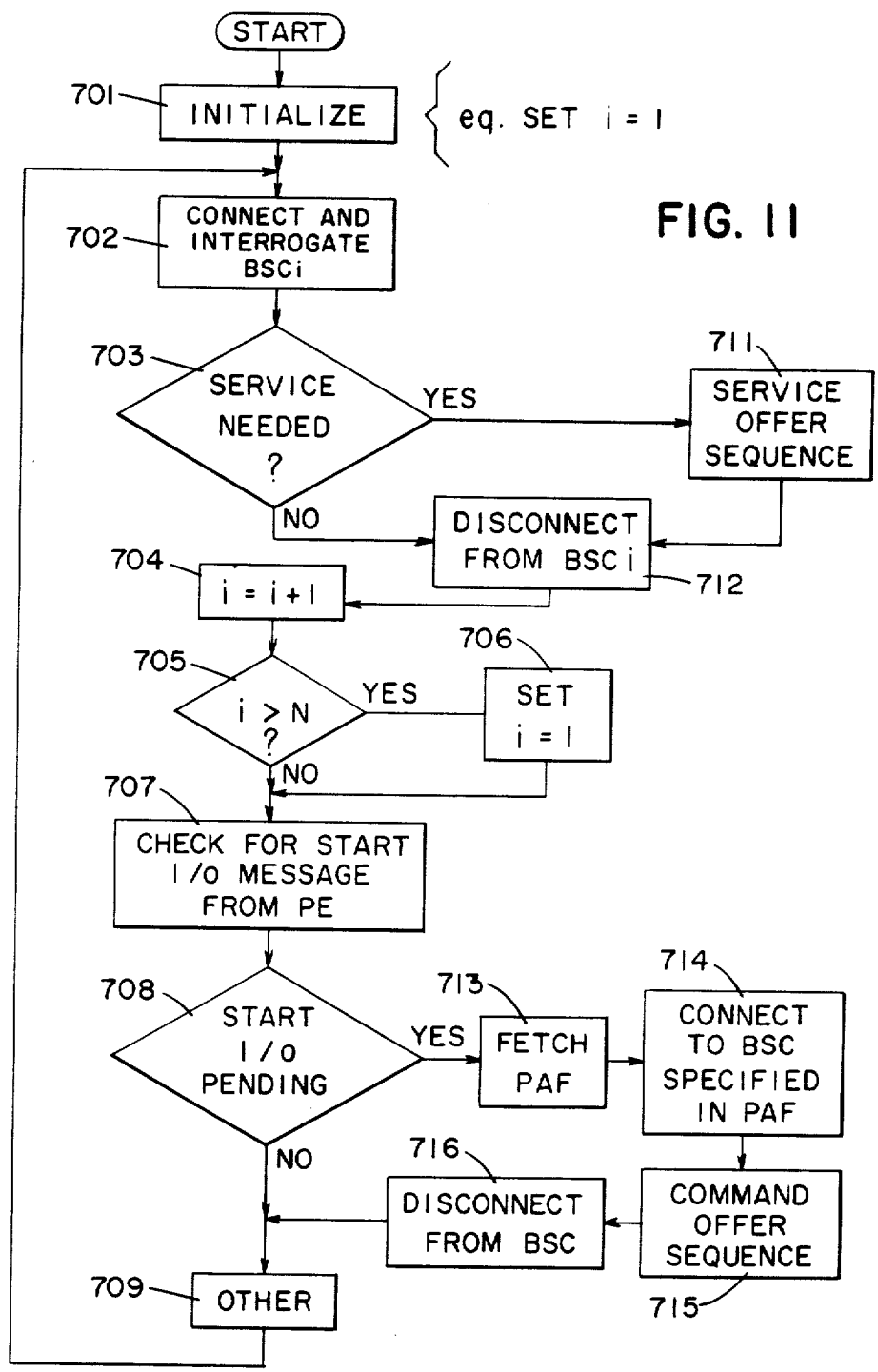
FIG. 11 is a detailed flow diagram of the interrogation loop performed by the SCCP.

Referring to FIG. 11, the interrogation loop of the SCCP 20 will now be described. When the SCCP 20 operation is first started, some internal initialization is performed, e.g., setting an index i to a value of 1 (block 701). The SCCP 20 then begins the interrogation of the BSCs, starting with BSC1, by connecting to the BSC (block 702). If service is required, a Service Needed flag is raised when the peripheral adapter is ready to start or continue a message sequence (block 703). If the service needed flag is detected, the SCCP 20 enters the service offer sequence (block 711), which will be described in detail below. When the service offer sequence is terminated, the SCCP 20 will disconnect from the BSC 32 (block 712), and proceed. If no service is required as a result of the pending question (block 703) the SCCP 20 disconnects from the BSC 32 and proceeds. The index i is incremented by 1 (block 704) and a check is made to determine if the index is greater than N, the number of ports to which a peripheral adapter 40 is attached (block 705). If the index i is greater than N, the index is reset to the value 1 (block 706), thereby causing the SCCP 20 to reinitiate the polling sequence of the BSCs 32. The SCCP 20 then checks if a start I/O message (i.e., CIOF) has been received from the PE 22 (block 707). If a CIOF message has been received (block 708), the SCCP 20 fetches the peripheral address fields (block 713), connects to the BSC 32 specified in the PAF (block 714), and then begins the command offer sequence (block 715), to be described in detail later. When the command offer sequence has been terminated, the SCCP 20 disconnects from the BSC (block 716) and proceeds. If no CIOF message is received, the SCCP proceeds. Some internal operations are performed (block 709) and the SCCP 20 operation continues by connecting and interrogating the next BSC in the sequence (block 702), thus repeating the interrogation loop.

Referring to FIG. 12, the command offer sequence will be described. The SCCP 20 sends a command offer message to the PA 40 (block 720) and waits for a response from PA 40 (block 721). The SCCP 20 checks to determine if the response is send information with a control/command count modifier (SI-CCT) (block 722). If the return message is not an SI-CCT, a check is made for a break message with a busy, absent, or not ready modifier (BRK-BSY, ABS, NRDY) (block 723). If the return message is not a BRK message a check is made for a wait message (WT-NULL) (block 728). If the message is not a wait message, the response is in error and error procedures are entered. If the message is a wait message, the SCCP waits for the service needed indication (block 729), sends a continue message (CON) to PA 40 when service needed is received (block 730), and returns to executing a wait from the PA 40 (block 721). It should be noted here that although the PA 40 is essentially slave to the SCCP 20 (as has been previously mentioned), the wait response from the PA 40 allows the PA 40 the capability to request some control over the SCCP. The wait message is an indication to the SCCP 20 that a response is forthcoming and a break operation (i.e., break-message) should not be performed. Although the wait request may be granted, the SCCP 20 still retains final control and may override the wait request if the requested time duration is excessive. If the message was a BRK message (block 723), the SCCP stores the busy, not attached, or not ready status in the status location of the IOF of central memory 10 and then exits (i.e., continues with the flow as shown in FIG. 11) the command offer sequence. If the response is a SI-CCT, the SCCP 20 sends a command appended message to the PA 40 (block 725) and waits for a response (block 726). When a response is received, a check is made to determine that a BRK-NULL response was received (block 727) since this is the only valid response as defined by the protocol. If the response is not a BRK-NULL message an error exists and error procedures are entered. If the response is BRK-NULL, the SCCP 20 stores the current status (block 724) in CM 10 indicating a successful command offer sequence was completed and exits.

Figure 13A:
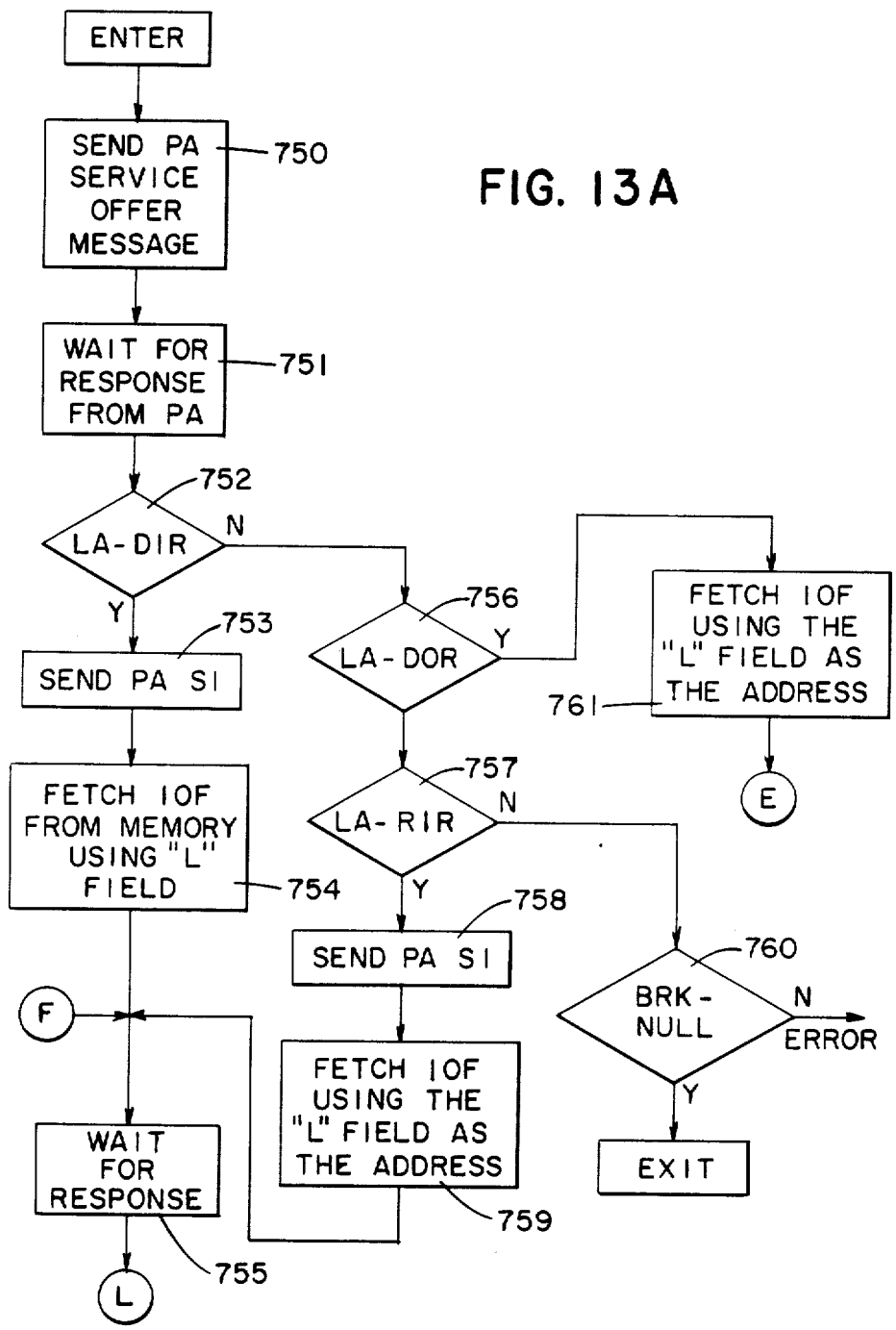
FIG. 13A-C are detailed flow diagrams of the service offer sequence performed by the SCCP.
Figure 13B:
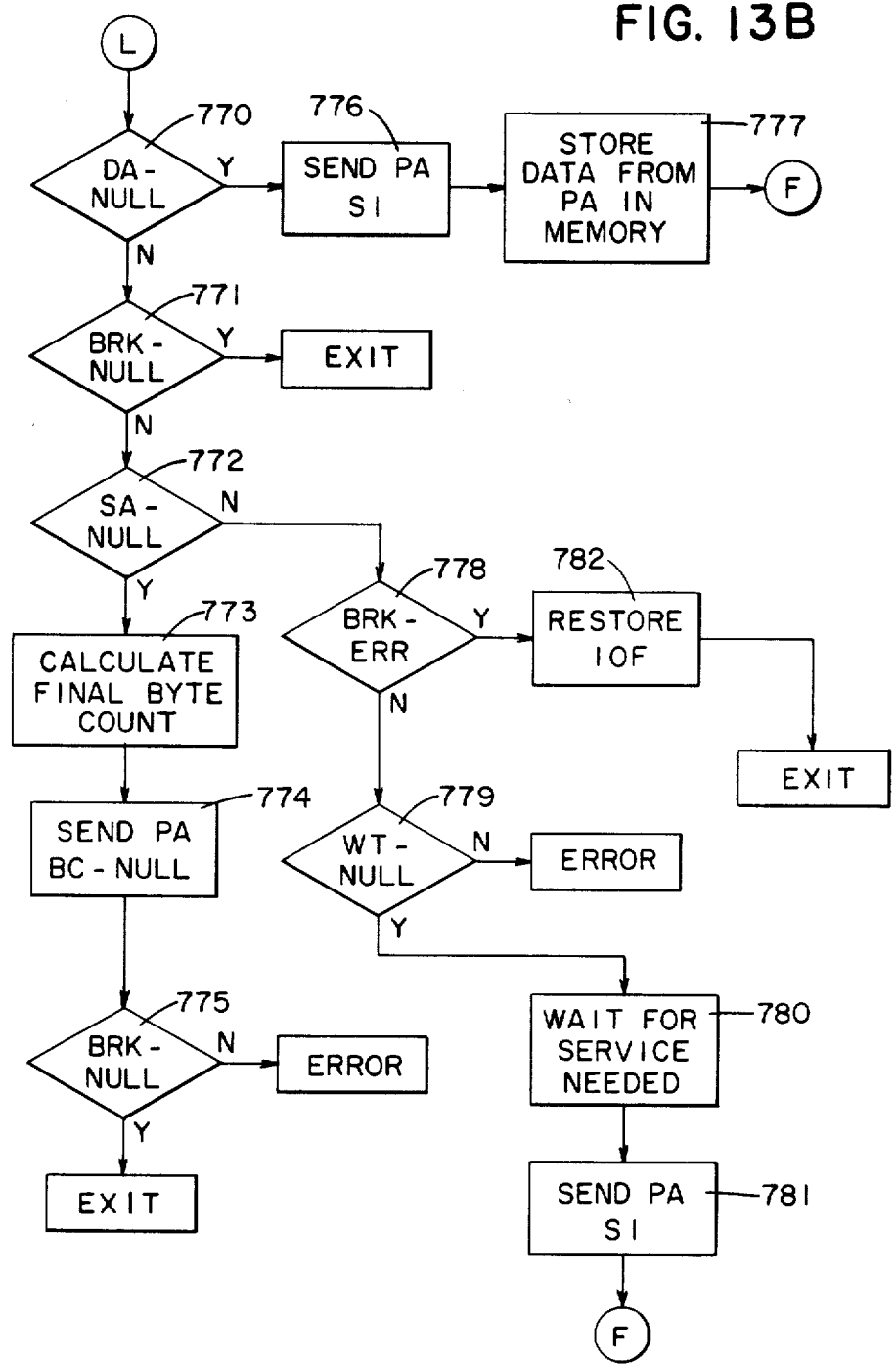
Figure 13C:
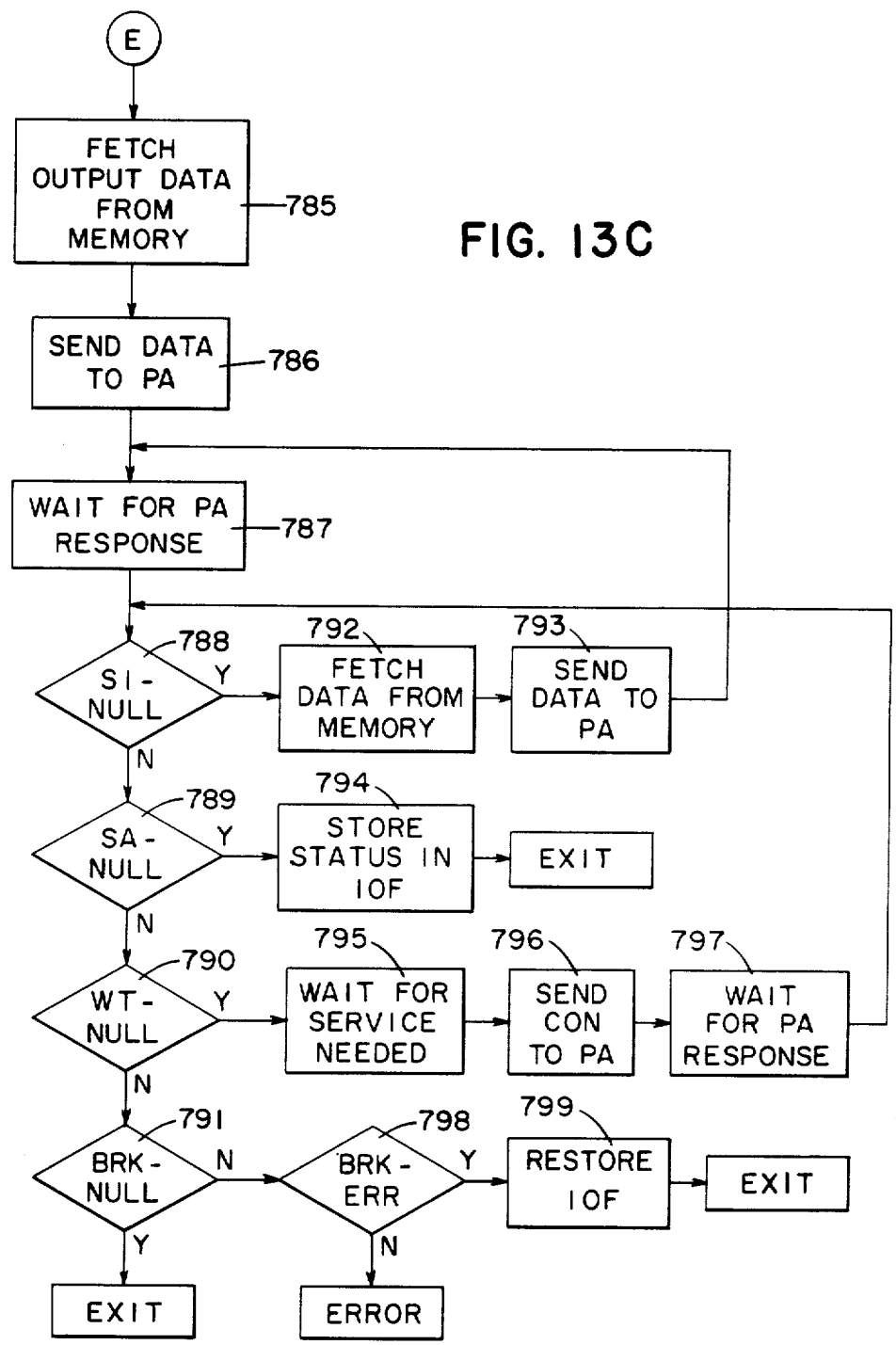

Referring to FIGS. 13A-C, the service offer sequence will be described. Upon detecting a Service Needed flag, the SCCP 20 connects to the BSC 32, sends a service offer message to the PA 40 (block 750), and waits for a response from the PA (block 751). The response is checked to determine the control byte command received from the PA 40. The control byte is checked to determine if it is a literal appended with a data input ready modifier, LA-DIR (block 752). If the control byte is not an LA-DIR, it is checked to determine if it is a literal appended with a data output ready modifier, LA-DOR (block 756). If the control byte is not an LA-DOR, it is checked to determine if it is a literal appended with a result input ready modifier, LA-RIR (block 757). If the control byte is not an LA-RIR, it is checked to determine if it is a break, BRK-NULL (block 760). If the control byte is a BRK-NULL, the routine exits. If the control byte is not BRK-NULL, an error exists and error recovery procedures are entered. If the control byte is a LA-RIR (block 757), the SCCP 20 sends a send information (SI) message to the PA 40 (block 758), fetches the IOF from central memory 10 (block 759) and waits for a response (block 755). As discussed above, the LA message from the PA 40 contains service set-up information, denoted in part as L field, which contains the address in central memory 10 specifying the IOF for the PA currently communicating with the CM 10. If the control byte is LA-DIR (block 752), the SCCP 20 sends an SI message to the PA 40 (block 753), fetches the IOF from central memory 10 (block 754), and waits for a response from the PA 40 (block 755).

If the response is a data appended message (block 770), the SCCP 20 sends an SI message to the PA 40 (block 776), stores the data from PA 40 in CM 10 (block 777), and waits for a response from the PA 40 (block 755). This loop continues until all the input data is sent, at which time the PA will respond with BRK-NULL message (block 771) and exit. This will terminate a data input sequence.

If the control byte response was neither a DA-NULL (block 70) nor a BRK-NULL (block 771), a check is made to determine if a status appended message is received (block 772). If the SA message is received, a final byte count is calculated and the result is stored in the STATUS location of the IOF (block 773), a break connection, BC-NULL, is sent to the PA 40 (block 774), a check is made to determine a BRK-NULL is received from PA 40 (block 775), and then exits. If a BRK-NULL is not received, an error condition exists and error recovery procedures are entered. If an SA-NULL is not received (block 772) a check is made for other valid responses. If a BRK-ERR is received (block 778), the response is stored in STATUS of IOF (block 782) and the service offer sequence is exited. If a BRK-ERR is not received a wait (WT-NULL) message is checked for (block 779). If a WT-NULL is not received an error exists and error recovery procedures are entered. If a WT-NULL is received (block 779), the SCCP 20 waits for the service needed indication (block 780), sends a SI message to PA 40 (block 781), and awaits a response (block 755).

If the initial LA response to the SO message is a literal appended with a data output ready modifier, LA-DOR (block 756), the SCCP 20 fetches the IOF from central memory 10 (block 761), fetches the output data from CM 10 (block 785), sends the data to PA 40 (block 786) via a data appended message, and waits for a response from PA 40 (block 787). When the response is received, it is checked for a send information, SI-NULL, (block 788), and if the response is SI-NULL, the output data is fetched from CM 10 (block 792), sent to PA 40 via a data appended message (block 793), and the SCCP then waits for a response (block 787). This loop continues until all the data has been outputted.

If the response is not SI-NULL (block 788), a check is made to determine if it is a status appended, SA-NULL (block 789). If the response is SA-NULL, the status message is stored in STATUS of IOF of CM 10 (block 794) and the service offer sequence is exited.

If the response is not SA-NULL, a check is made to determine if the response is a wait, WT-NULL (block 790). If a WT-NULL message is sent, the SCCP 20 waits for a service needed indication (block 795), sends a continue message to the PA 40 (block 796), and waits for a response from the PA 40 (block 797). If the message is not WT-NULL, a check is made for a break BRK-NULL (block 791). If the message is a BRK-NULL, the service offer sequence is exited, terminating the data output sequence. If the message is not BRK-NULL, a check is made for a BRK-ERR message (block 798). If the message is not BRK-ERR an error situation exists and error recovery procedures are entered. If the message is BRK-ERR, the SCCP 20 stores the response in STATUS of IOF in central memory 10 (block 799) and the service offer sequence is exited.

The operation of the SSA 28 will now be described. Referring to FIG. 14A–14D, the complete transfer sequence between central system 1 (CS1) and central system 2 (CS2) is shown. This is a typical sequence in which CS1 is transferring data to CS2. It will be understood that CS2 shown in FIG. 1 is identical to CS1.

Figure 14A:
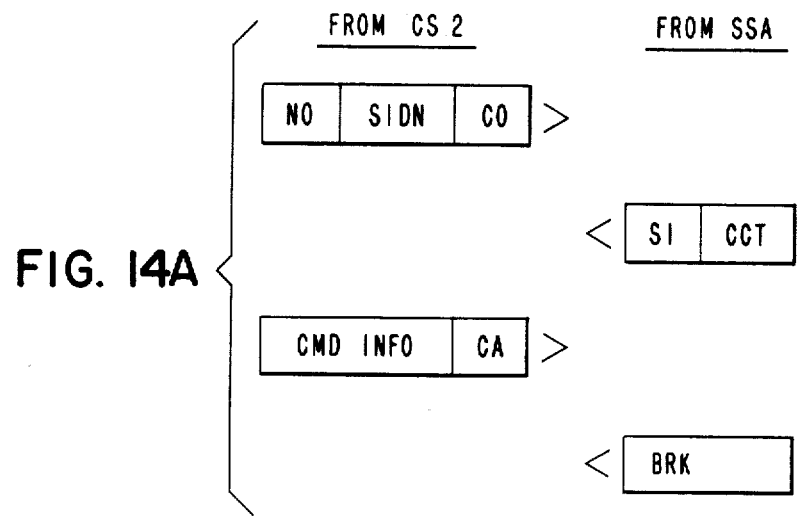
FIG. 14A through 14D shows the command messages in a typical data transfer sequence between two central systems.
Figure 14B:
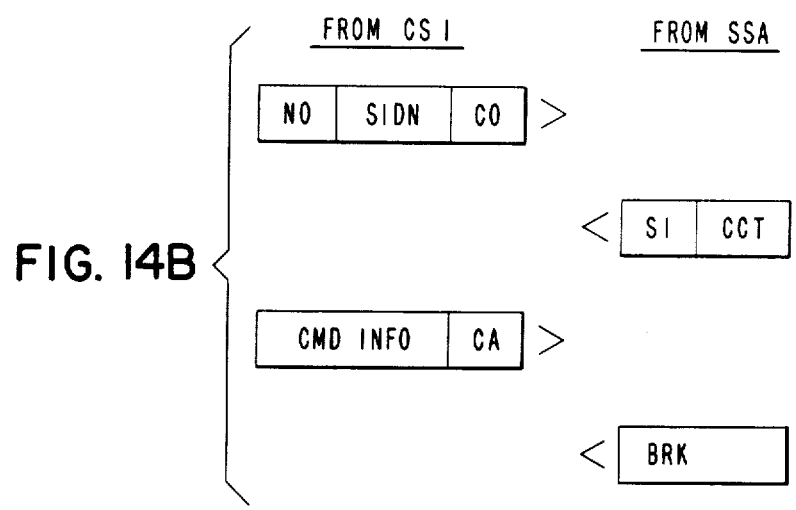
Figure 14C:
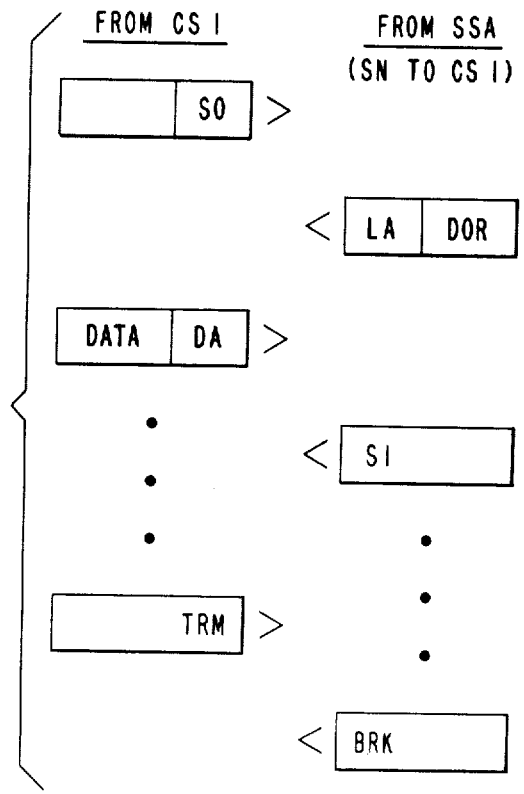

Before any transfers can take place, namely any input to CS2, CS2 must enable the system to system adapter (SSA) 28 to indicate it is ready to receive an input. This is accomplished by the PE 22 of CS2 causing the SCCP 20 of CS2 to start the I/O with the CIOF message after having set up central memory 10 of CS2. Referring to FIG. 14A, the SCCP 20 of CS2 connects to the proper PCP 32 as specified in the PAF (peripheral address field) and sends a command offer message to the SSA 28. The modifier (SIDN) is the source ID number and the second byte of the message is the unit number specifying CS2. The SSA 28 responds with a send information message, modifier CCT of the control byte indicating a control/command count. This response indicates additional command bytes are required. The SCCP 20 of CS2 sends the additional control and command information to the SSA 28 via the command appended message. The SSA 28 accepts and stores the control information and returns a break message terminating the enabling part of the transmission. CS2 is now ready to accept input data.

At some subsequent time, CS1 desires to send a message to CS2. (Since CS1 initiates the I/O, CS1 may be referred to as the initiating central system and CS2 may be referred to as the responding central system). Referring to FIG. 14, after the PE 22 has initiated the CIOF message and set up central memory 10 of the CS1, the SCCP 20 of CS1 initiates a command offer message to the SSA, the message containing the source ID number and the unit number specifying CS2. The SSA 28 in turn responds with the send information message along with the control byte indicating control/command count. SCCP 20 of CS1 initiates the command appended message containing the command information, the command information including the total byte count of the data message to be transferred. The SSA 28 responds with a break message terminating this message sequence.

At this point, the SSA now acts as an output device for CS1. Referring to FIG. 14, the SSA 28 initiates the Service Needed control signal to CS1. Upon detecting the Service Needed signal, the SCCP 20 of the CS1 initiates a service offer message in which the SSA 28 responds with a literal appended message containing the data output request modifier. The SCCP 20 of CS1 transfers the data appended message along with the data and the SSA 28 responding with the send information message. The data appended/send information sequence continues until all the data has been transferred to the SSA, the SSA storing the data in an internal buffer memory to be described hereinunder. When all the data has been transferred, the SCCP 20 of CS1 initiates the terminate message to which the SSA 28 responds with a break control byte terminating the output message sequence.

Figure 14D:
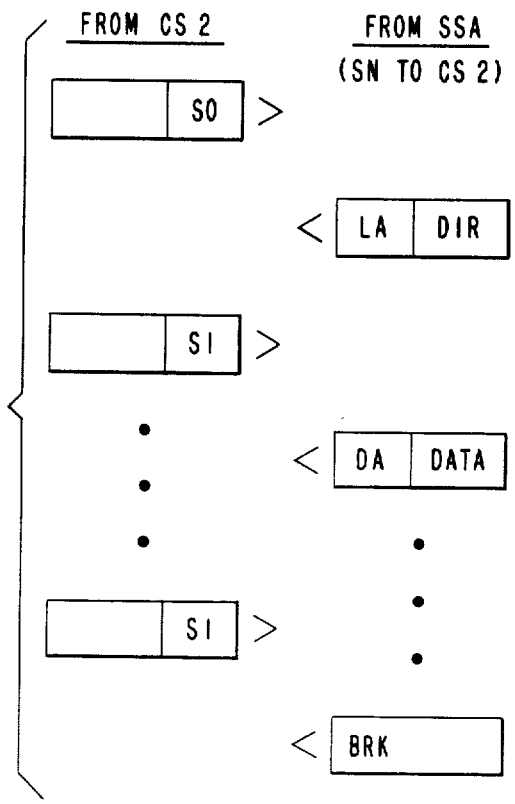

At this point, the SSA 28 now acts as an input device for CS2. Referring to FIG. 14D, the input sequence is initiated by the SSA 28 raising the Service Needed control signal to CS2. Upon the detection of the Service Needed signal by the SCCP 20 of CS2, the SCCP 20 of CS2 initiates the service offer message to which the SSA 28 responds with a literal appended message having the data input request modifier. SCCP 20 of CS2 returns the send information signal to which the SSA 28 responds with the data appended message and the data contained within the message. The send information/data appended sequence continues until all the data has been transferred. When all the data has been transferred to CS2, the SSA responds to a send information message with a break message.

After the data has been transferred, the status sequence with CS2 and SSA 28 takes place and upon successful completion of this message sequence, the status sequence with CS1 then occurs, the status sequence being analogous to that described above. It will be understood that other normal termination sequences may take place other than those used in this specific example, the other sequences having been described above.

Figure 15:
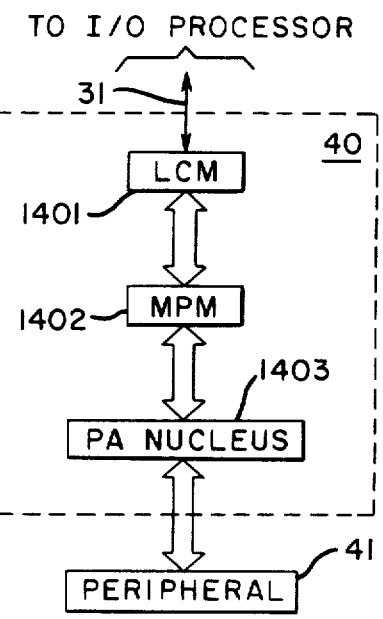
FIG. 15 is a block diagram of the peripheral adapter.

Referring to FIG. 15, a block diagram of the peripheral adapter 40 is shown comprising a link control module (LCM) 1401, coupled to the message control module (MPM) 1402, which in turn is coupled to te peripheral adapter (PA) nucleus 1403. The LCM 1401 interfaces with the I/O processor 23 via bit serial line 31 and performs the bit-to-byte or byte-to-bit translation. The PA nucleus 1403 interfaces with a peripheral device 41 and comprises a data buffer and the logic for controlling the functions of the peripheral device 41. Peripheral controller logic functions are well known by those skilled in the art; hence, the functions are not discussed herein. The data buffer of PA neculeus 1403 provides for isolating the peripheral device transfer rate from the bit serial link/PCP 32 transfer rate. The message protocol module 1402 nucleus 1403 for controlling the I/O with the processing element 22, the control being administered by interfacing with the SCCP 20 in accordance with the defined message protocol.

Figure 16:
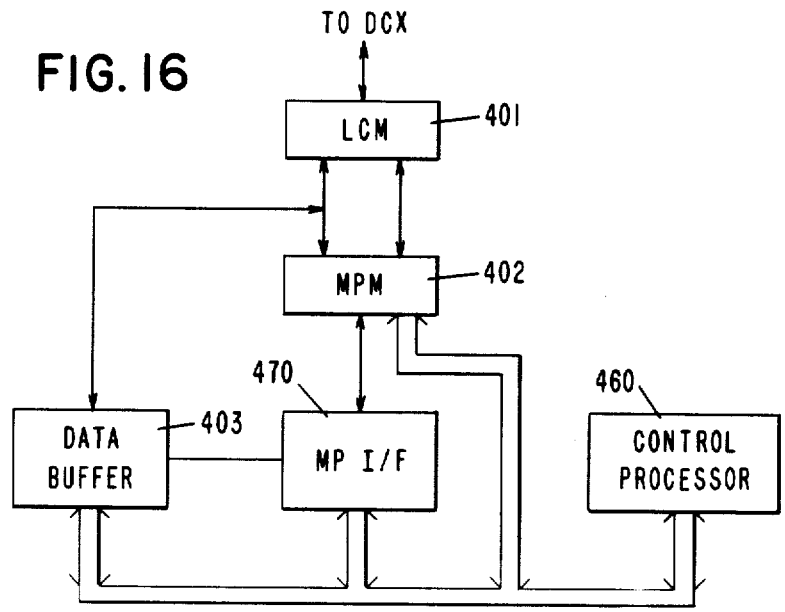
FIG. 16 is a block diagram of the system to system adapter of the present invention.

A block diagram of the SSA 28 is shown in FIG. 16. The SSA comprises a Link Control Module (LCM) 401 which interfaces a Message Protocol Module (MPM) 402 to the DCX 26. The LCM 401 is also coupled to a data buffer 403. A control processor 460 is coupled to the MPM 402, and to the data buffer 403. A message protocol interface 470 couples to the MPM 402, the control processor 460, and the data buffer 403.

The data buffer 403 provides intermediate data storage for information passed between the central systems. The data buffer of the preferred embodiment comprises dual 9×2K RAMs for storing up to 4K bytes of data. The LCM 401 interface with the DCX 26 via the bit serial links 31 and performs the bit-to-byte or byte-to-bit synchronization and translation. The message protocol interface (MPIF) 470 interfaces with the control processor 460 and provides the buffer control for the dual buffers of the data buffer 403. The control processor 460 provides the controller functions of the SSA 28 which cause it to act as an input/output peripheral. The control processor 460 executes commands transferred by the central system and initiates data transfer between the data buffer 403 and the central system. The control processor 460 of the preferred embodiment comprises a 8085 microprocessor with a 16K×8 EPROM. The control functions are generated by the execution of the instruction words (or code) store in the EPROM, the code being delineated in APPENDIX II of the microfiche, entitled "SSA Controlcode Listing", pages 1 through 153.

Figure 17:
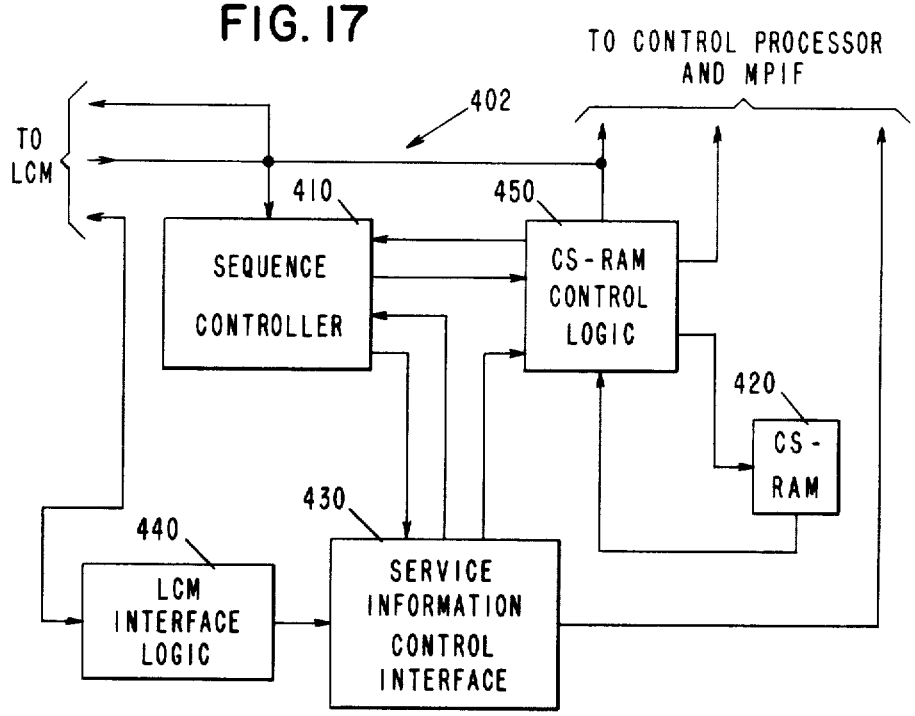
FIG. 17 is a block diagram of the message protocol module of the adapter system to system of FIG. 16.

Referring to FIG. 17, a block diagram of the MPM 402 is shown. The MPM 402 is a standard IOSS module for the PAs 40, shown as MPM 1402 in FIG. 15, which administers the standard procedures of the defined protocol for the peripheral controllers, it being understood by those skilled in the art that the peripheral device 41 comprises a peripheral device and an associated peripheral device controller. A sequence controller 410 provides the overall control of MPM 402. The sequence controller 410 comprises, in part, a ROM, a ROM sequencer, and a state register, not shown. The ROM sequencer cause the microinstructions of the ROM to be executed, the execution of the microinstructions generating the control signals such that the MPM 402 can perform a defined operation. The ROM is configured such that the microinstruction words perform the defined operations upon execution, the defined operations being responses to the SCCP 20 in accordance with the defined message protocol, as described above. ROM sequencers are well known by those skilled in the art and will not be discussed further here. Sequence controller 410 interfaces with the LCM 401 for receiving a message control byte. Logic within the sequence controller 410 operates to initiate a branch to the appropriate routine stored within the ROM, based on the configuration of the state register and the message control byte of the message received. Command and results inputs which are transferred between a CS-RAM 420 and central memory 10, are controlled by the sequence controller 410. Data transfers between the SSA 28 and central memory 10 are also controlled by the sequence controller 410.

The Service Information Control Interface (SICI) 430 provides the interface control to the control processor 460 and MPIF 470, the control processor 460 performing the control functions of an input/output peripheral device analogous to that of a peripheral device controller. The SICI also provides sequencer controller 410 timing and CS-RAM 420 timing. SICI 430 also interfaces with LCM Interface Logic 440 for transferring various control signals between the LCM 401 and the control processor 460. A service request signal, received from the control processor 460 acting as a peripheral device controller, is transferred to the LCM 401 via LCM Interface Logic 440 causing the LCM 401 to transmit a Service Needed signal to the SCCP 20, as described above. The SICI 430 also provides data read and write signals to the MPIF 470 for reading from or writing to the data buffer 403. An interrupt to the control processor 460 is also provided to indicate a transmission sequence, which was prompted by the control processor 460, is properly completed.

The Command Status RAM (CS-RAM) 420 is a read-write scratchpad memory for providing temorary storage. Information required by tne control processor 460 to communicate with SCCP 20 in accordance with the defined message protocol is stored in CS-RAM 420. The CS-RAM 420 serves as an information exchange point between the sequence controller 410 and the control processor 460. The CS-RAM 420 is organized to store the command and control information, including the PAFs, received from the SCCP 20. The CS-RAM stores peripheral service type information received from peripheral device controller, including a data output ready indication, data input ready indication, results input ready indication, and information to be contained in the service setup information field of the literal appended message discussed hereinunder. The CS-RAM also stores the status information received from the control processor 460. The CS-RAM 420 of the preferred embodiment is an 8×1K RAM.

The CS-RAM Control Logic 450 provides the administering and multiplexing of CS-RAM address and data between the sequence controller 410 and the control processor 460. Access to the CS-RAM 420 is divided equally between the sequence controller 410 and the control processor 460 by a timing control signal. When the timing control signal is in a first state, the sequence controller 410 can read or write data in the CS-RAM 420. When the timing control signal is in a second state, the control processor 460 can read or write data in the CS-RAM 420. Separate CS-RAM address counters and data registers are provided for the sequence controller 410 and the control processor 460 so that continuity of address and data is maintained for both elements with the multiplexing scheme.

The LCM interface logic 440 contains the logic for providing the handshake control to pass serial bytes between LCM 401 and MPM 402 and between LCM 401 and the data buffer of SSA 403. An End of Message signal from the LCM 401 is a control signal inputted to the MPM 402 via the LCM interface logic 410 indicating the termination of a transmission sequence from the SCCP 20.

Figure 18:
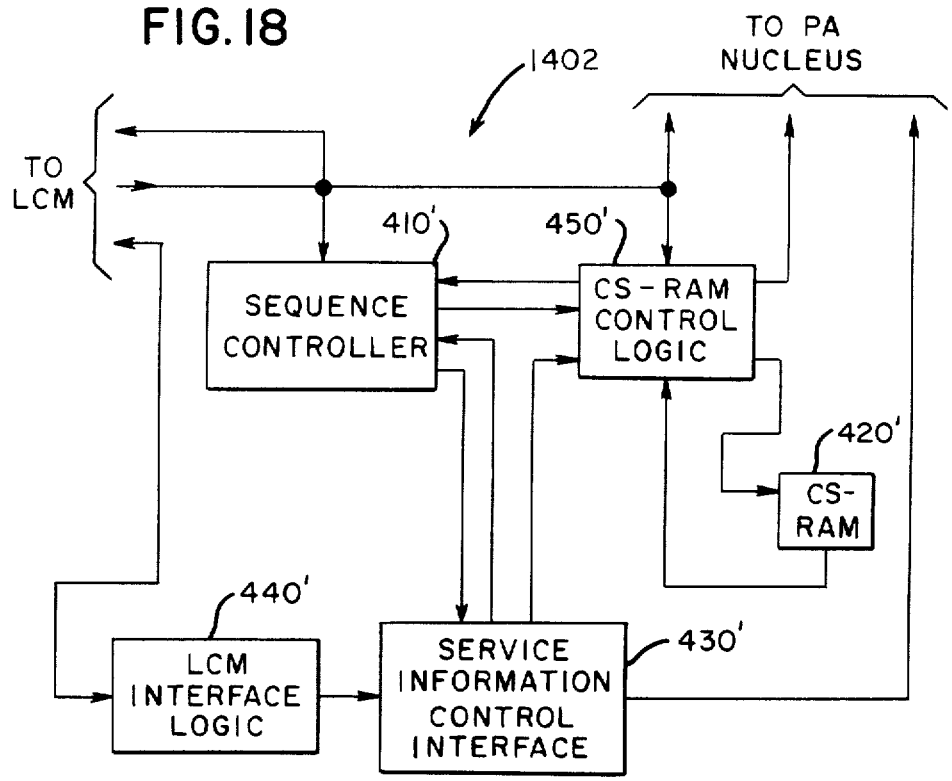
FIG. 18 is a block diagram of the message protocol module of the peripheral adapter of FIG. 15.

FIG. 18 shows how the MPM 1402 interfaces with the PA nucleus 1403. The sequence controller 410', CS-RAM 420', service information control interface 430', LCM interface logic 440' and CS-RAM control logic 450' are the same as the corresponding elements of the MPM 402 shown in FIG. 17, except that the MPM 1402 interfaces with the PA nucleus rather than the control processor and MPIF.

As previously explained, the SSA 28, which contains the MPM 402, appears to each central system as a peripheral. In the following description, the operation of the MPM with respect to the PA 40 and a peripheral is the same as the operation of the MPM 402 with respect to the SSA 28 and another central system such as CS2. Thus, in the case of transfer between central systems such as CS1 and CS2; in the description of FIGS. 19A-19E, PA 40 may also refer to SSA 28, and peripheral nucleus and peripheral may also refer to the central system supplying or receiving data in a manner similar to a peripheral.

The operation of the MPM 402 is achieved by the execution of the microinstructions stored in the ROM of the sequence controller 410. The execution of the microinstructions, which serve to configure the ROM of sequence controller 410, implement the functions of the defined message protocol performed by the PA 40 as described above.

The MPM 402 has five defined states, the idle state, the command output state, the data input state, the data output state, and the result input state, denoted herein as state A, state B, state C, state D, and state E respectively. Referring to FIG. 19A through 19E, the flow diagrams depicting typical transmission sequences of each of the five states are shown. In the normal transfer of information as defined by the message protocol, each MPM state is expecting one of a particular message type in order to perform an orderly completion of the transfer sequence. If one of the expected message types is not received, an error condition exists. Each state performs a response or a plurality of responses with SCCP 20 corresponding to the current state of MPM 402. In each state, the MPM 402 waits for the input message from the SCCP 20 to complete, determines the message type from the control byte, and responds accordingly. This structure is due primarily to the message-response exchange of the defined message protocol described above in which the PA 40 is essentially slave to the SCCP 20.

Figure 19A:
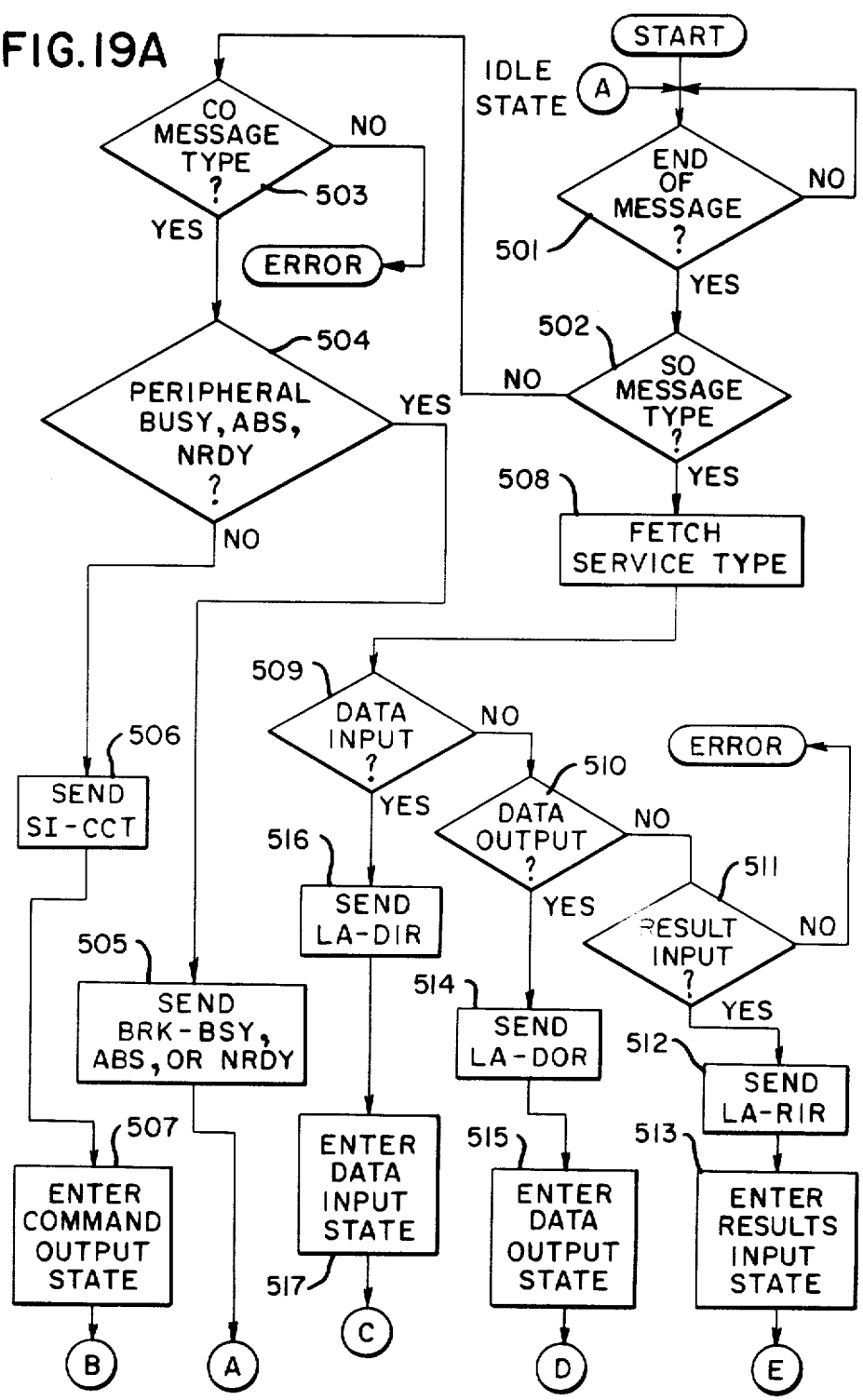
FIGS. 19A through 19E is a flow diagram of the microinstruction sequences of the message protocol module of FIGS. 17 and 18.

FIG. 19A shows the flow diagram for the idle state. When the PA 40 is powered, the normal equipment initialization occurs and the MPM 402 starts operation by entering the idle state in a loop waiting for the end of message signal from LCM 401 (block 501). When the end of message signal is detected, the control byte is checked to determine if the message is a service offer (SO) message (block 502). If the message is not as SO message, a check is performed to determine if the message is a command offer (CO) message (block 503). If the message is not a CO message, an error condition is present and error procedures are entered. If the message is a CO message (block 503), the MPM determines if the peripheral is busy, absent or not ready (block 504) by checking the appropriate status flag in CS-RAM 420. If the peripheral is busy, absent, or not ready, the MPM 402 causes the PA 40 to respond with a break message BRK, with a busy modifier BSY, an absent modifier ABS, or a not ready modifier NRDY (block 505), to the SCCP 20. If the peripheral is not busy (block 504), the MPM 402 causes the PA 40 to respond with a send information message having a control/command count modifier, SI-CCT (block 506), to the SCCP 20 indicating the number of PAFs to be transmitted, and then enters the command output state (block 507).

If the message is determined to be an SO message (block 502), the MPM 402 determines the service type (block 508) by fetching information in CS-RAM 420 set up by the PA nucleus 403. The information is utilized to determine if the service type is data input (block 509). If the service type is not data input, a check is made for a data output service type (block 510). If the service type is not data output, a check is made for a result input service type (block 511). If the service type is not results input an error condition exists and error recovery procedures are entered. If the service type is results input, the MPM 402 cause the PA 40 to respond with a literal appended message with a results input ready modifier, LA-RIR (block 512), to the SCCP 20. The LA-RIR message also contains literal information, i.e. information which the SCCP 20 will need to communicate with central memory 10, which is stored in CS-RAM 420. The MPM 402 then enters the results input state (block 513). If the service type is determined to be data output (block 510), the MPM 402 causes the PA 40 to respond with a literal appended message and a data output ready modifier, LA-DOR (block 514) to the SCCP 20, the message also containing literal information obtained from CS-RAM 420. The MPM 402 then enters the data output state (block 515). If the service type is determined to be data input (block 509), the MPM 402 causes the PA 40 to respond to SCCP 20 with a literal appended message, the modifier being data input ready, LA-DIR (block 516), along with the literal information from CS-RAM 420. The MPM 402 then enters the data input state (block 517).

Figure 19B:
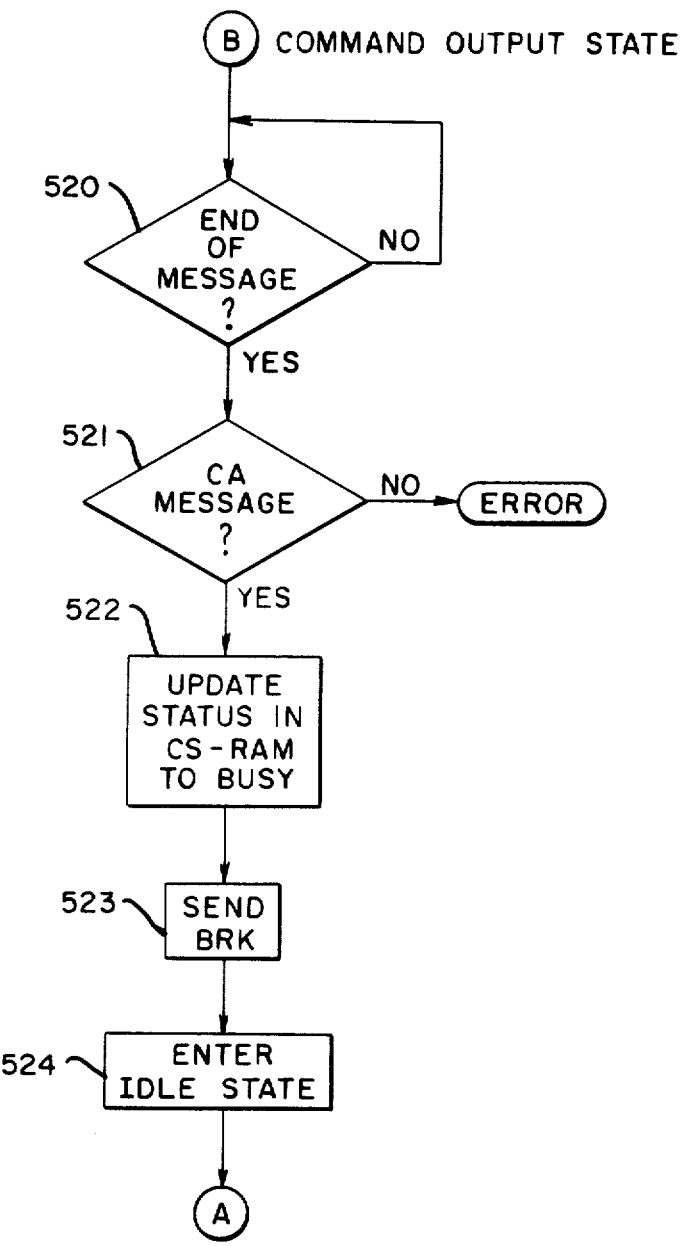

The flow diagram of the command output state is shown in FIG. 19B. The MPM 402 waits for the command appended message, CA (block 520), from SCCP 20 by continuously checking the end of message signal from LCM 401. When the end of message signal is detected, the message type is checked (block 521). If the message type is not CA, an error condition exists and error recovery procedures are entered. If the message type is CA, the command bytes appended to the control byte are stored in the allocated locations of CS-RAM 420, and the status of the peripheral is updated to BUSY (block 522). The MPM 402 responds to the SCCP 20 by transmitting a break message, BRK (block 523), and enters the idle state (block 524) completing the initial transmission sequence.

Figure 19C:
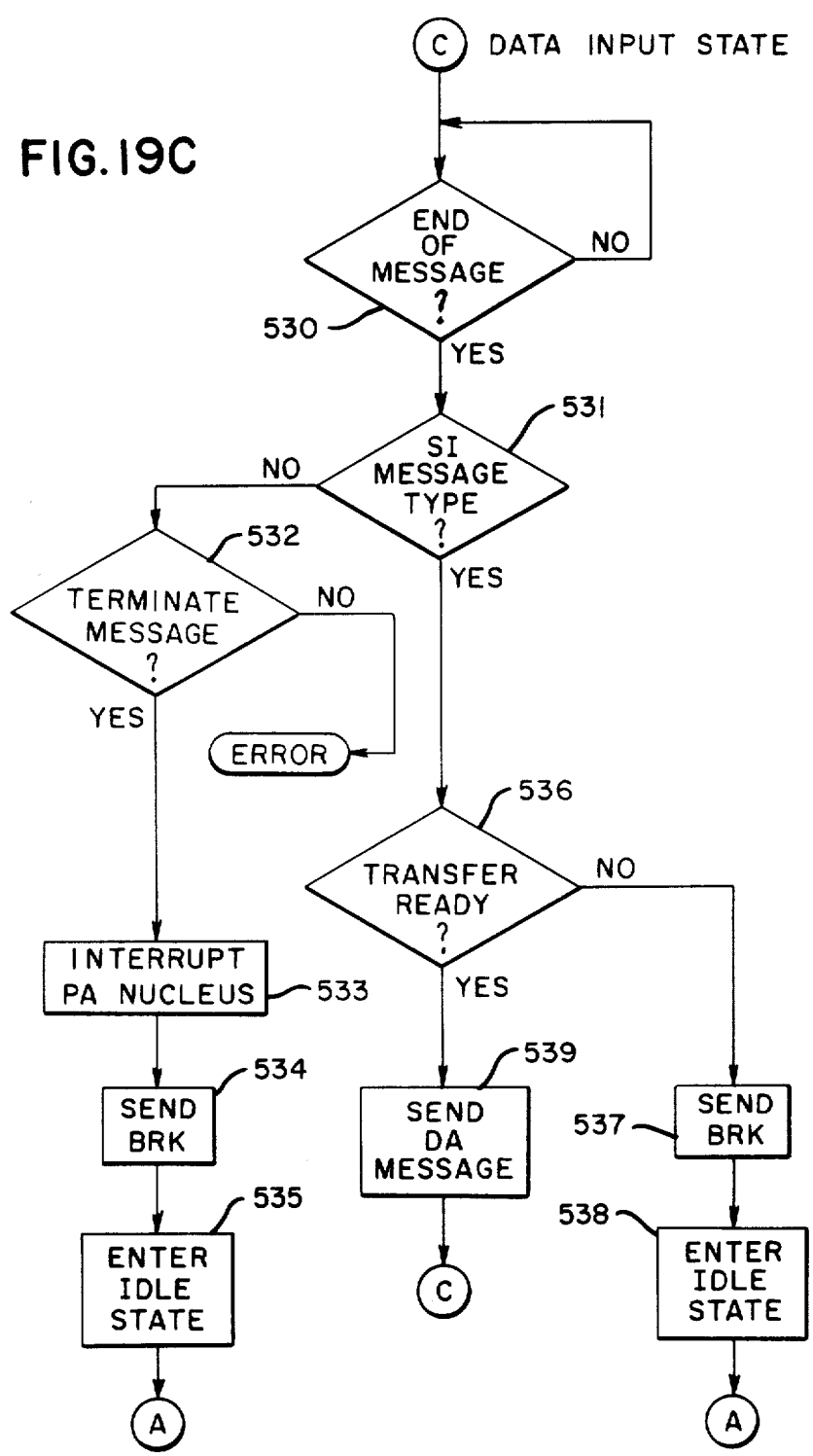

The flow diagram of the data input state is shown in FIG. 19C. The MPM 402 waits for a message from the SCCP 20 to complete by continuously checking the end of message signal (block 530). When the end of message signal is detected, the MPM 402 checks to determine if the message type (block 531) is send information, SI. If the message type is not SI, a check is made to determine if the message type is terminate, TRM (block 532). If the message type is not TRM, an error condition exists and error recovery procedures are entered. If the message type is TRM, the SCCP 20 is indicating no more data is to be inputted and is terminating the sequence. The MPM 402 interrupts the PA nucleus 403 (block 533) indicating to the peripheral that the transfer of data is properly completed. The MPM 402 causes the PA 40 to respond to the SCCP 20 with a break message, BRK (block 534), and then returns to the idle state (block 535). If the message type is determined to be SI (block 531), the MPM 402 checks to determine if the PA nucleus is ready for transferring data by testing a READY control signal at the MPM 402-PA nucleus 403 interface (block 536). If the READY control signal is not present, the MPM 402 causes the PA 40 to transmit a BRK response (block 537) to SCCP 20 and then enters the idle state (block 538). If the READY control signal is present (block 536), the MPM 402 causes the data appended message to be transmitted to SCCP 20 (block 539). The MPM 402 remains in the data input state, returning to checking for the end of message signal from LCM 401 (block 530). In this manner, the SI/DA message-response sequence continues until all the data is inputted.

Figure 19D:
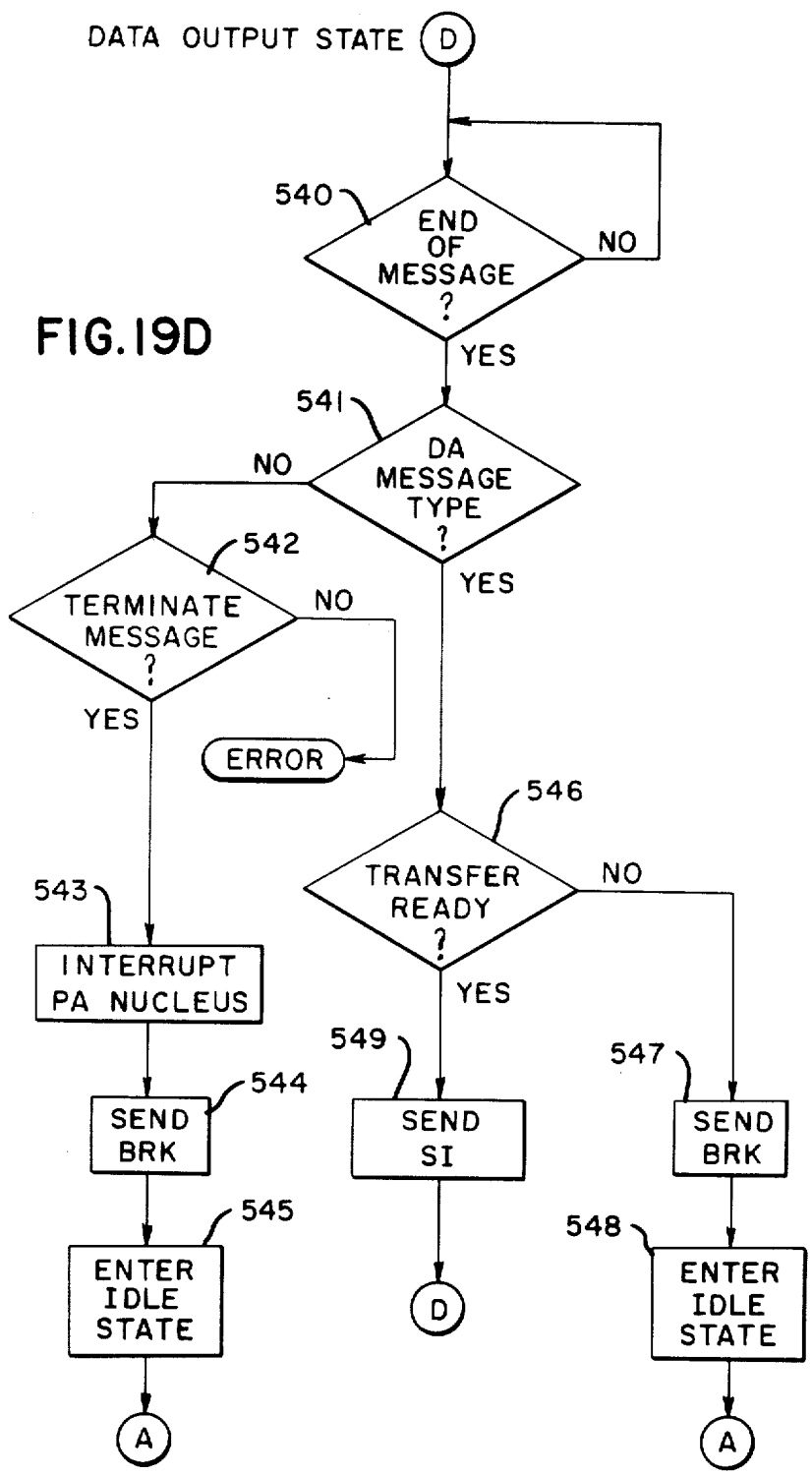

The flow diagram of the data output state is shown in FIG. 19D. The MPM 402 waits for a message from the SCCP 20 to complete by continuously checking the end of message signal (block 540). When the end of message signal is detected, the MPM 402 checks to determine if the message type (block 541) is data appended, DA. If the message type is not DA, a check is made to determine if the message type is terminate, TRM (block 542). If the message type is not TRM, an error condition exists and error recovery procedures are entered. If the message type is TRM, the SCCP 20 is indicating no more data is to be outputted and is terminating the sequence. The MPM 402 interrupts the PA nucleus 403 (block 543) indicating to the peripheral that the transfer of data is properly completed. The MPM 402 causes the PA 40 to respond to the SCCP 20 with a break message, BRK (block 544), and then returns to the idle state (block 545). If the message type is determined to be DA (block 541), the MPM 402 checks to determine if the PA nucleus 403 is ready for receiving data by testing the READY control signal at the MPM 402-PA nucleus 403 interface (block 546). If the READY control signal is not present, the MPM 402 causes the PA 40 to transmit a BRK response (block 547) to SCCP 20 and then enters the idle state (block 548). If the READY control signal is present (block 546), the MPM 402 causes the send information message to be transmitted to SCCP 20 (block 549). The MPM 402 remains in the data output state, returning to checking for the end of message signal from LCM 401 (block 540). In this manner, the DA/SI message-response sequence continues until all the data is outputted.

Figure 19E:
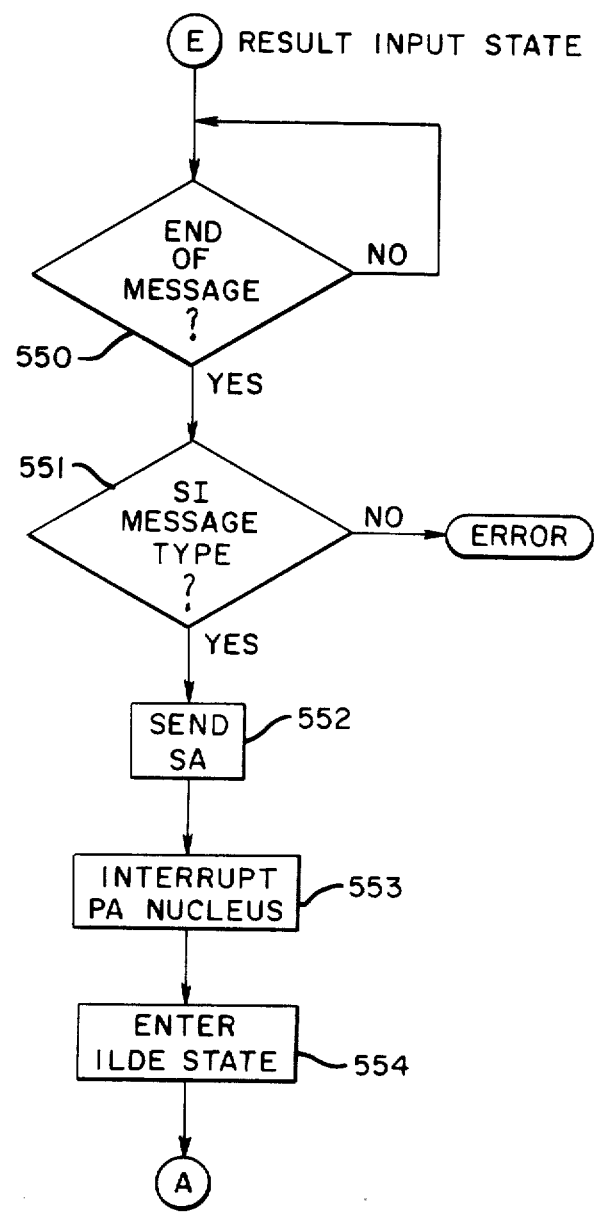

The flow diagram of the result input state is shown in FIG. 19E. The MPM 402 waits for the send information message, SI (block 550), from SCCP 20 by continously checking the end of message signal from LCM 401. When the end of message signal is detected, the message type is checked (block 551). If the message type is not SI, an error condition exists and error recovery procedures are entered. If the message type is SI, the MPM 402 causes the PA 40 to transmit a status appended message, SA (block 552) to the SCCP 20 with the result information appended to the control byte. The MPM 402 interrupts the PA nucleus 403 (block 553) indicating to the peripheral that the status transfer sequence is properly completed, and then enters the idle state (block 554).

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a data processing system having a plurality of central systems, each of said central systems having
   a central memory,
   a processor and
   at least one serial channel control processor (SCCP), said data processing system further having an adapter for providing for the exchange of data between two of said central systems, said adapter acting as a peripheral of one central system and then as a pheripheral of the other central system, the method of exchanging data between two of said central systems comprising the steps of:
   a. executing first I/O instructions from the processor of a first central system when the first central system desires to receive data from a second central system;
   b. responsive to said first I/O instructions, establishing by said processor of the first central system in the central memory of said first central system, a first I/O field which includes a check field and a first starting address for storing the data to be received;
   c. after establishing the I/O field in the first central memory, issuing first instructions by the first central system processor to the SCCP of said first central system to engage in a first command message sequence with said adapter, said first command message sequence for establishing communications with a second central system, and containing said check field and the address of said first I/O field;

d. transmitting said first command message sequence including said check field and said address of said first I/O field between the SCCP of the first central system and said adapter;

e. responsive to said first command message sequence, said adapter storing said check field and said address of said first I/O field;

f. when data is to be transferred from said second to said first central systems, executing second I/O instructions from the processor of said second central system;

g. responsive to said second I/O instructions, establishing by said processor of said second central system in the central memory of said second central system, a second I/O field which includes said check field and a second starting address in said second central memory for locating the data to be transferred;

h. after establishing the second I/O field in the second central memory, issuing instructions by the second central system processor to the SCCP of said second central system to engage in a second command message sequence with said adapter, said second command message sequence for completing communication with said first central system, and containing said check field and the address of said second I/O field;

i. transmitting said second command message sequence including said check field and said address of said second I/O field between the SCCP of the second central system and said adapter;

j. responsive to said second command message sequence, said adapter storing said check field and said address of said second I/O field;

k. issuing a first service needed message from said adapter to said second central system;

l. responsive to said first service needed message, verifying by the SCCP of said second central system that the check field stored in said adapter is the same as the check field included in said second I/O field from the second I/O field address in the memory of said second central system;

m. responsive to positive verification in step 1, transmitting by the SCCP of said second central system, data from the central memory of said second central system to said adapter;

n. subsequent to the successful completion of step m, issuing a second service needed message from said adapter to said first central system;

o. responsive to said second service needed message, verifying by the SCCP of said first central system that the check field stored in said adapter is the same as the check field included in said first I/O field from the first I/O field address in the memory of said first central system; and p. responsive to positive verification in step o, transmitting the data received by said adapter in step m from said adapter to the central memory of said first central system.

2. The method of claim 1 wherein step m. comprises:

a''. the SCCP of said second central system getting data starting from the second starting address in the central memory of said second central system as included in the second I/O field in the central memory of said second central system, and storing the data in a buffer in said second central system SCCP;

b''. the SCCP of said second central system transmitting the data stored in said second central system SCCP to said adapter; and c''. the adapter storing the transmitted data in a buffer in said adapter.

3. The method of claim 2 wherein step p. comprises:

a'''. the adapter transmitting data stored in said buffer in said adapter to said first central system SCCP;

b'''. the SCCP of said first central system storing the data transmitted in step a''' in a buffer in said first central system SCCP; and c'''. the SCCP of said first central system effecting the dispositioning of the data stored in step b''' starting at the first starting address in said first central memory as included in the first I/O field in the central memory of said first central system.

4. The method of claim 1 including, subsequent to transmitting steps d, i, m and p, placing said adapter in an idle state.

5. In a data processing system having a plurality of central systems, each of said central systems having
a central memory,
a processor and
at least one serial channel control processor (SCCP), said data processing system further having an adapter for providing for the exchange of data between two of said central systems, said adapter acting as a peripheral of one central system and then as a peripheral of the other central system, the apparatus for exchanging data between two of said central systems comprising:

a. means in the processor of a first central system for executing first I/O instructions when the first central system desires to receive data from a second central system;

b. means in said processor of the first central system responsive to said first I/O instructions for establishing in the central memory of said first central system, a first I/O field which includes a check field and a first starting address for storing the data to be received;

c. means in the first central system processor for issuing, after establishing the first I/O field in the first central memory, instructions to the SCCP of said first central system to engage in a first command message sequence with said adapter, said first command message sequence for establishing communications with a second central system, and containing said check field and the address of said first I/O field;

d. means for transmitting said first command message sequence including said check field and said address of said first I/O field between the SCCP of the first central system and said adapter;

e. means in said adapter responsive to said first command message sequence for storing said check field and said address of said first I/O field;

f. means in the processor of said second central system for executing second I/O instructions when data is to be transferred from said second to said first central systems;

g. means in said processor of said second central system responsive to said second I/O instructions for establishing in the central memory of said second central system, a second I/O field which includes said check field and a second starting address in said second central memory for locating the data to be transferred;

h. means in the second central system processor for issuing instructions, after establishing the second I/O field in the second central memory, to the SCCP of said second central system to engage in a second command message sequence with said adapter, said second command message sequence for completing communication with said first central system, and containing said check field and the address of said second I/O field;

i. means for transmitting said second command message sequence including said check field and said address of said second I/O field between the SCCP of the second central system and said adapter;

j. means in said adapter responsive to said second command message sequence for storing said check field and said address of said second I/O field;

k. means in said adapter for issuing a first service needed message to said second central system;

l. means in the SCCP of said second central system responsive to said first service needed message for verifying that the check field stored in said adapter is the same as the check field included in said second I/O field from the second I/O field address in the memory of said second central system;

m. means in the SCCP of said second central system responsive to positive verification of the SCCP of said second central system for transmitting, data from the central memory of said second central system to said adapter;

n. means in said adapter for issuing a second service needed message to said first central system subsequent to the successful transmission of data from the central memory of said second central system to said adapter;

o. means in the SCCP of said first central system responsive to said second service needed message for verifying that the check field stored in said adapter is the same as the check field included in said first I/O field from the first I/O field address in the memory of said first central system; and p. means responsive to said positive verification of the SCCP of said first central system for transmitting to the central memory of said first central system, the data received by said adapter from said second central system.

* * * * *

UNITED STATES PATENT AND TRADEMARK OFFICE
CERTIFICATE OF CORRECTION

PATENT NO. : 4,562,533
DATED : Dec. 31, 1985
INVENTOR(S) : Alfred Hodel et al.

It is certified that error appears in the above—identified patent and that said Letters Patent is hereby corrected as shown below:

Col. 20, line 67, after "establishing the", insert -- first --.

Col. 20, line 68, after "issuing" cancel "first".

Col. 21, line 50, after "step" the number "1" should be the letter "l".

Col. 24, line 21, after "means" insert -- in said adapter --.

Signed and Sealed this

Fifteenth Day of July 1986

[SEAL]

Attest:

DONALD J. QUIGG

Attesting Officer

Commissioner of Patents and Trademarks